United States Patent
Nogami et al.

(10) Patent No.: US 10,021,651 B2
(45) Date of Patent: Jul. 10, 2018

(54) TERMINAL DEVICE, BASE STATION APPARATUS, AND COMMUNICATION METHOD

(71) Applicant: SHARP KABUSHIKI KAISHA, Sakai, Osaka (JP)

(72) Inventors: Toshizo Nogami, Sakai (JP); Kazuyuki Shimezawa, Sakai (JP); Wataru Ouchi, Sakai (JP); Naoki Kusashima, Sakai (JP); Alvaro Ruiz Delgado, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/316,269

(22) PCT Filed: Jun. 19, 2015

(86) PCT No.: PCT/JP2015/067735
§ 371 (c)(1),
(2) Date: Dec. 5, 2016

(87) PCT Pub. No.: WO2015/194662
PCT Pub. Date: Dec. 23, 2015

(65) Prior Publication Data
US 2017/0164296 A1 Jun. 8, 2017

(30) Foreign Application Priority Data
Jun. 20, 2014 (JP) .................................. 2014-126935

(51) Int. Cl.
*H04W 52/12* (2009.01)
*H04W 52/14* (2009.01)
(Continued)

(52) U.S. Cl.
CPC ......... *H04W 52/146* (2013.01); *H04W 52/36* (2013.01); *H04W 76/025* (2013.01); *H04W 76/15* (2018.02)

(58) Field of Classification Search
CPC .......... H04W 72/0473; H04W 76/025; H04W 52/04–52/60; H04W 76/15
(Continued)

(56) References Cited

U.S. PATENT DOCUMENTS

| | | | |
|---|---|---|---|
| 2015/0312930 A1* | 10/2015 | Han .................. | H04W 72/1247 370/336 |
| 2017/0105179 A1* | 4/2017 | Kusashima ......... | H04W 52/146 |
| 2017/0195028 A1* | 7/2017 | Shimezawa .......... | H04B 7/0626 |

OTHER PUBLICATIONS

3GPP TSG RAN WG1 Meeting #77, Seoul, Korea, May 19-23, 2014, R1-142264.*

(Continued)

*Primary Examiner* — Raymond Dean
(74) *Attorney, Agent, or Firm* — Birch, Stewart, Kolasch & Birch, LLP

(57) ABSTRACT

A power for a physical uplink channel is determined based on whether or not $P_{CMAX}$ that is a maximum transmit power for a terminal device is exceeded, in a case where dual connectivity is not configured for the physical uplink channel, and a power for the physical uplink channel in a first cell group is determined based on whether or not $P_{MCG}$ that is a maximum transmit power for the first cell group is exceeded, a power for the physical uplink channel in a second cell group is determined based on whether or not $P_{SCG}$ that is a maximum transmit power for the second cell group is exceeded, $P_{MCG}$ is calculated by an arithmetic operation that uses at least $P_{CMAX}$ and $P_{SeNB}$, and $P_{SCG}$ is calculated by an arithmetic operation that uses at least $P_{CMAX}$ and $P_{MeNB}$, in a case where the dual connectivity is configured for the physical uplink channel.

6 Claims, 12 Drawing Sheets

(51) Int. Cl.
*H04W 52/36* (2009.01)
*H04W 76/02* (2009.01)
*H04W 76/15* (2018.01)

(58) Field of Classification Search
USPC .......................................... 455/522; 370/318
See application file for complete search history.

(56) References Cited

OTHER PUBLICATIONS

InterDigital "Power sharing in dual connectivity", R1-142347, 3GPP TSG-RAN WG1 #77, Seoul, Korea, May 19-23, 2014, XP050789464, Retrieved from the Internet: URL:http://www.3gpp.org/ftp/Meetings_3GPP_SYNC/RAN1/RAN1/Docs/ [retrieved on May 18, 2014].
Intel Corporation, "Discussion on physical layer aspects for support of dual connectivity", 3GPP TSG-RAN WG1 #77, R1-142569, Seoul, South Korea, May 19-23, May 2014.
Lte Advanced, "3rd Generation Partnership Project; Technical Specification Group Radio Access Network; Evolved Universal Terrestrial Radio Access (E-UTRA); Physical layer procedures", (Release 11), Technical Specification 3GPP TS 36.213 V11.2.0 (Feb. 2013).
NTT DOCOMO, "Power-control mechanisms for dual connectivity", 3GPP TSG RAN WG1 Meeting #77, R1-142264, Seoul, Korea, May 19-23, 2014.
NTT DOCOMO, Inc., "Deployment scenarios and design goals for dual connectivity", 3GPP TSG-RAN WG2 #81, R2-130444, St. Julian's, Malta, Jan. 28-Feb. 1, 2013.

\* cited by examiner

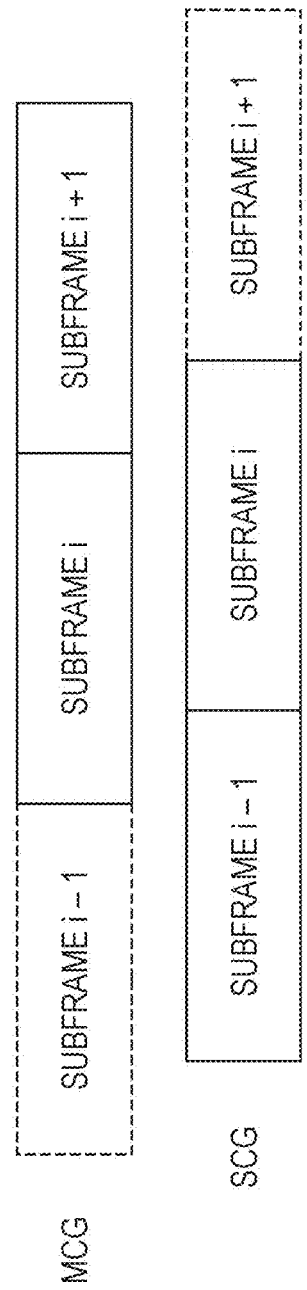

TERMINAL DEVICE, BASE STATION APPARATUS, AND COMMUNICATION METHOD

TECHNICAL FIELD

Embodiments of the present invention relate to a technology associated with a terminal device, a base station apparatus, and a communication method, in all of which efficient sharing of channel state information is realized.

This application claims the benefit of Japanese Priority Patent Application No. 2014-126935 filed on Jun. 20, 2014, the entire contents of which are incorporated herein by reference.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency and time units, which is referred to as an Orthogonal Frequency-Division Multiplexing (OFDM) communication scheme or a resource block.

Furthermore, in 3GPP, discussions on Advanced EUTRA that realizes higher-speed data transfer and has upper compatibility with EUTRA have taken place. In EUTRA, a communication system is available on the assumption of a network in which base station apparatuses have almost the same cell constitution (cell size). However, in Advanced EUTRA, a study on the communication system has been conducted on the assumption of a network (heterogeneous wireless network or Heterogeneous Network) in which base station apparatuses (the cells) having different constitutions are present in a mixed manner in the same area.

A study has been conducted on a dual connectivity technology in which, like in the heterogeneous network, in the communication system in which a cell (macro cell) having a large radius and a cell (small cell) having a smaller radius than the macro cell are arranged, a terminal device makes a connection to the macro cell and the small cell at the same time and thus performs communication (NPL 1).

In NPL 1, a study has been conducted on a network in which it is assumed that, when the terminal device makes an attempt to realize the dual connectivity between the cell (the macro cell) having a large radius (cell size) and the cell (the small cell (or a pico cell)) having a small radius, low speed is caused and delay occurs in a backbone (backhaul) line between the macro cell and the small cell. That is, there is a likelihood that delay in giving and taking control information or user information between the macro cell and the small cell will make it difficult or hard to realize a function that can be realized in the related art.

Furthermore, in NPL 2, a method is disclosed in which, when the terminal device makes connections at the same time to multiple cells that are connected to one another with high-speed backhaul, channel state information in a cell is fed back.

CITATION LIST

Non Patent Literature

NPL 1: R2-130444, NTT DOCOMO, 3GPP TSG RAN2#81, Jan. 28-Feb. 1, 2013.

NPL 2: 3rd Generation Partnership Project; Technical Specification Group Radio Access Network; Evolved Universal Terrestrial Radio Access (E-UTRA); Physical layer procedures (Release 10), February 2013, 3GPP TS 36.213 V11.2.0 (2013-2)

SUMMARY OF INVENTION

Technical Problem

When making connections at the same time to multiple cells that are connected to one another with high-speed backhaul, the terminal device can collectively control transmit powers in each cell with respect to the base station apparatus. However, in a case where the dual connectivity that supports low-speed backhaul is used, because sharing of information among cells is limited, a transmit power control method as is, in the related art is difficult to use.

Several aspects of the present invention are provided in view of the problems described above. An object of the invention is to provide a terminal device, a base station apparatus, and a communication method, in all of which transmit power control can be efficiently performed without depending on a backhaul speed.

Solution to Problem (1) In order to accomplish the object described above, the following means are contrived according to several aspects of the present invention. That is, according to an aspect of the present invention, there is provided a terminal device including: a higher layer processing unit that configures a first cell group and a second cell group and configures $P_{MeNB}$ that is a guaranteed power in the first cell group, and $P_{SeNB}$ that is a guaranteed power in the second cell group; and an uplink subframe generation unit that generates a physical uplink channel, in which a power for the physical uplink channel is determined based on whether or not $P_{CMAX}$ that is a maximum transmit power for the terminal device is exceeded, in a case where dual connectivity is not configured for the physical uplink channel, and in which a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that uses at least $P_{CMAX}$ and $P_{SeNB}$ and $P_{SCG}$ is calculated by an arithmetic operation that uses at least $P_{CMAX}$ and $P_{MeNB}$ in a case where the dual connectivity is configured for the physical uplink channel.

(2) Furthermore, in the terminal device according to the aspect of the present invention, a value that is $P_{CMAX}$ is configured for $P_{MCG}$, in a case where the terminal device recognizes that a subframe in the second cell group does not overlap a subframe in the first cell group.

(3) Furthermore, in the terminal device according to the aspect of the present invention, a value that is $P_{CMAX}$ is configured for $P_{SCG}$, in a case where the terminal device recognizes that a subframe in the first cell group does not overlap a subframe in the second cell group.

(4) According to an aspect of the present invention, there is provided a base station apparatus that communicates with a terminal device, the base station apparatus including: a higher layer processing unit that configures a first cell group and a second cell group and configures $P_{MeNB}$ that is a guaranteed power in the first cell group, and $P_{SeNB}$ that is a guaranteed power in the second cell group; and an uplink subframe reception unit that receives a physical uplink channel, in which a power for the physical uplink channel is determined based on whether or not $P_{CMAX}$ that is a maximum transmit power for the terminal device is exceeded, in a case where dual connectivity is not configured for the physical uplink channel, and in which a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that uses at least $P_{CMAX}$ and $P_{SeNB}$, and $P_{SCG}$ is calculated by an arithmetic operation that uses at least $P_{CMAX}$ and $P_{MeNB}$, in a case where the dual connectivity is configured for the physical uplink channel.

(5) Furthermore, in the base station apparatus according to the aspect of the present invention, a value that is $P_{CMAX}$ is configured for $P_{MCG}$, in a case where the terminal device recognizes that a subframe in the second cell group does not overlap a subframe in the first cell group.

(6) Furthermore, in the base station apparatus according to the aspect of the present invention, a value that is $P_{CMAX}$ is configured for $P_{SCG}$, in a case where the terminal device recognizes that a subframe in the first cell group does not overlap a subframe in the second cell group.

(7) Furthermore, according to an aspect of the present invention, there is provided a communication method for use in a terminal device, the communication method including: a step of configuring a first cell group and a second cell group; a step of configuring $P_{MeNB}$ that is a guaranteed power in the first cell group, and $P_{SeNB}$ that is a guaranteed power in the second cell group; and a step of generating a physical uplink channel, in which a power for the physical uplink channel is determined based on whether or not $P_{CMAX}$ that is a maximum transmit power for the terminal device is exceeded, in a case where dual connectivity is not configured for the physical uplink channel, and in which a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that uses at least $P_{CMAX}$ and $P_{SeNB}$ and $P_{SCG}$ is calculated by an arithmetic operation that uses at least $P_{CMAX}$ and $P_{MeNB}$ in a case where the dual connectivity is configured for the physical uplink channel.

(8) Furthermore, according to an aspect of the present invention, there is provided a communication method for use in a base station apparatus that communicates with a terminal device, the communication method including: a step of configuring a first cell group and a second cell group; a step of configuring $P_{MeNB}$ that is a guaranteed power in the first cell group, and $P_{SeNB}$ that is a guaranteed power in the second cell group; and a step of receiving a physical uplink channel, in which a power for the physical uplink channel is determined based on whether or not $P_{CMAX}$ that is a maximum transmit power for the terminal device is exceeded, in a case where dual connectivity is not configured for the physical uplink channel, and in which a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that uses at least $P_{CMAX}$ and $P_{SeNB}$ and $P_{SCG}$ is calculated by an arithmetic operation that uses at least $P_{CMAX}$ and $P_{MeNB}$ in a case where the dual connectivity is configured for the physical uplink channel.

Advantageous Effects of Invention

According to several aspects of the present invention, in a wireless communication system in which a base station apparatus and a terminal device communicate with each other, transfer efficiency can be improved.

BRIEF DESCRIPTION OF DRAWINGS

FIG. 12 is a diagram illustrating an example of a subframe for uplink transmission in the dual connectivity.

DESCRIPTION OF EMBODIMENTS

<First Embodiment>

A first embodiment of the present invention will be described below. A base station apparatus (a base station, a NodeB, or an eNodeB (eNB)) and a terminal device (a terminal, a mobile station, a user device, or a user equipment (UE)) are described referring to a communication system (a cellular system) that performs communication in a cell.

Main physical channels and physical signals that are used in EUTRA and Advanced EUTRA are described. A channel means a medium that is used for signal transmission, and a physical channel means a physical medium that is used for the signal transmission. According to the present invention, the physical channel and the signal can be used synonymously. There is a likelihood that in EUTRA and Advanced EUTRA, the physical channel will be added in future or an architecture or format type thereof will be changed or added, but this change or addition does not have any influence on a description of the present embodiment.

In EUTRA and Advanced EUTRA, scheduling of the physical channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical channel. The resource block is defined by a fixed frequency domain that is constituted from a set of multiple subcarriers (for example, 12 subcarriers) along a frequency axis and by a domain that is constituted from a fixed transmission time interval (one slot).

Figure 1:
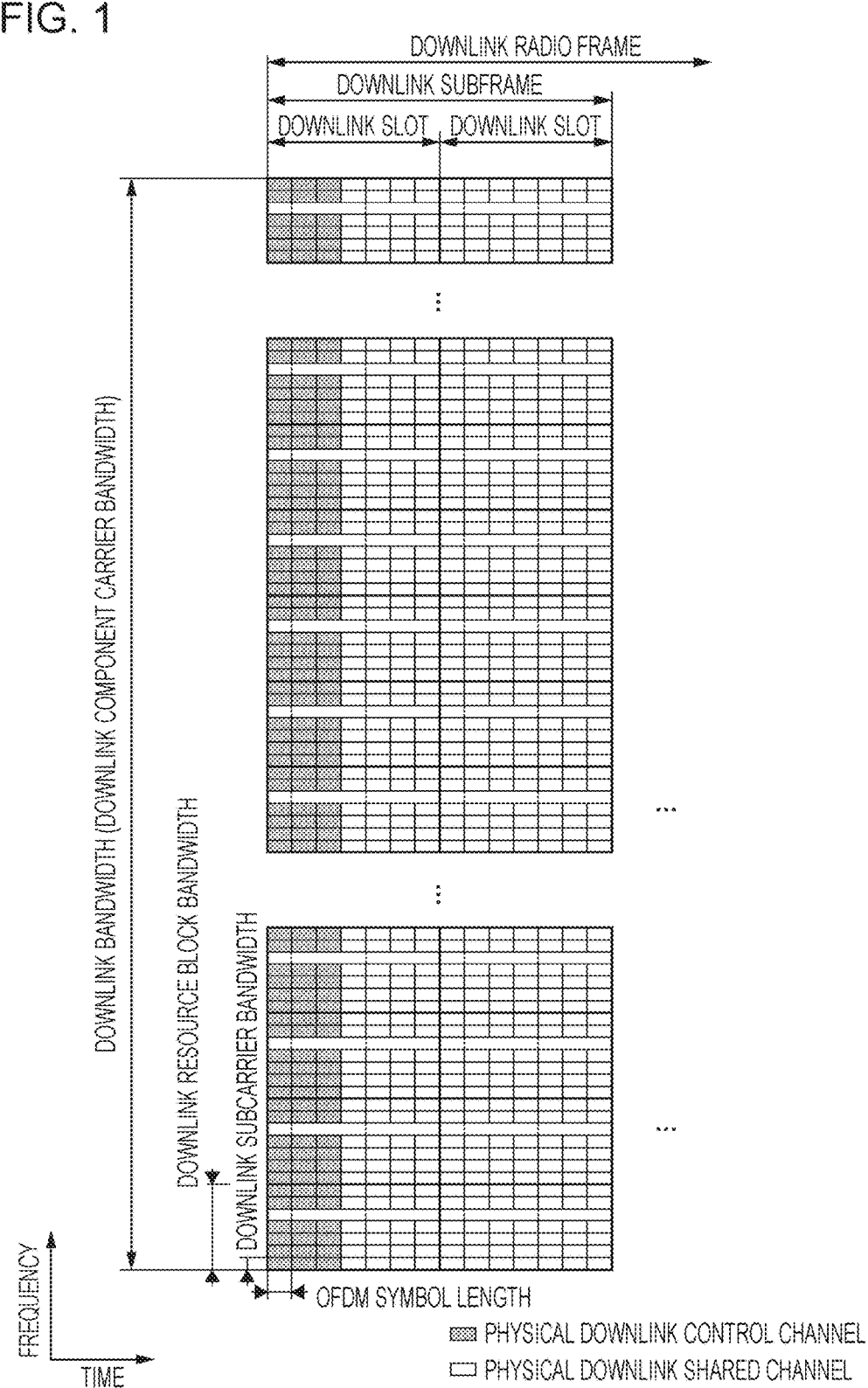
FIG. 1 is a diagram illustrating an example of a constitution of a downlink radio frame according to a first embodiment.

FIG. 1 is a diagram illustrating one configuration example of a downlink radio frame according to the present embodiment. For downlink, an OFDM access scheme is used. For downlink, a PDCCH, an EPDCCH, a Physical Downlink Shared CHannel (PDCCH), and the like are allocated. A downlink radio frame is constituted from a downlink resource block (RB) pair. The downlink RB pair is a unit for allocation or the like of a downlink radio resource and is constructed from a frequency band (an RB bandwidth), which has a width that is determined in advance) and a time duration (two slots=one subframe). One downlink RB pair is constituted from two downlink RBs (RB bandwidth×slot) that are continuous in a time domain. One downlink RB is constituted from 12 subcarriers in a frequency domain. Furthermore, in the time domain, in a case where a normal cyclic prefix is attached, one downlink RB is constituted from seven OFDM symbols, and, in a case where a cyclic prefix that is longer than usual is attached, is constituted from six OFDM symbols. A domain that is stipulated with one subcarrier in the frequency domain and one OFDM symbol in the time domain is referred to as a Resource Element (RE). The Physical Downlink Control Channel is a physical channel over which downlink control information is transmitted such as a terminal device identifier, scheduling information on the Physical Downlink Shared Channel, scheduling information on a Physical Uplink Shared Channel, a modulation scheme, a coding rate, or a retransmission parameter. Moreover, here, a downlink subframe is imposed on one Component Carrier (CC). However, a downlink subframe is stipulated for every CC and the downlink subframe is mostly synchronized between CCs.

Moreover, although not illustrated here, Synchronization Signals, a physical broadcast information channel, or a downlink reference signal (Reference Signal (RS)) may be allocated to the downlink subframe. As downlink reference signals, there are a cell-specific reference signal (Cell-Specific RS (CRS)) that is transmitted at the same transmission port as the PDCCH, a channel state information reference signal (CSI-RS) that is used for measurement of Channel State Information (CSI), a terminal-specific reference signal (UE-specific RS (URS)) that is transmitted at the same port as one portion of the PDSCH, a demodulation reference signal (Demodulation RS (DMRS)) that is transmitted at the same transmission port as the EPDCCH, and the like. Furthermore, a carrier to which the CRS is not mapped may be satisfactory. At this time, the same signal (which is referred to as an extended synchronization signal) as a signal that corresponds to one or several transmission ports (for example, only a transmission port 0) or all transmission ports for the CRS can be inserted, as a signal for tracking a time and/or a frequency, into one or several subframes (for example, first and sixth subframes of a radio frame).

Figure 2:
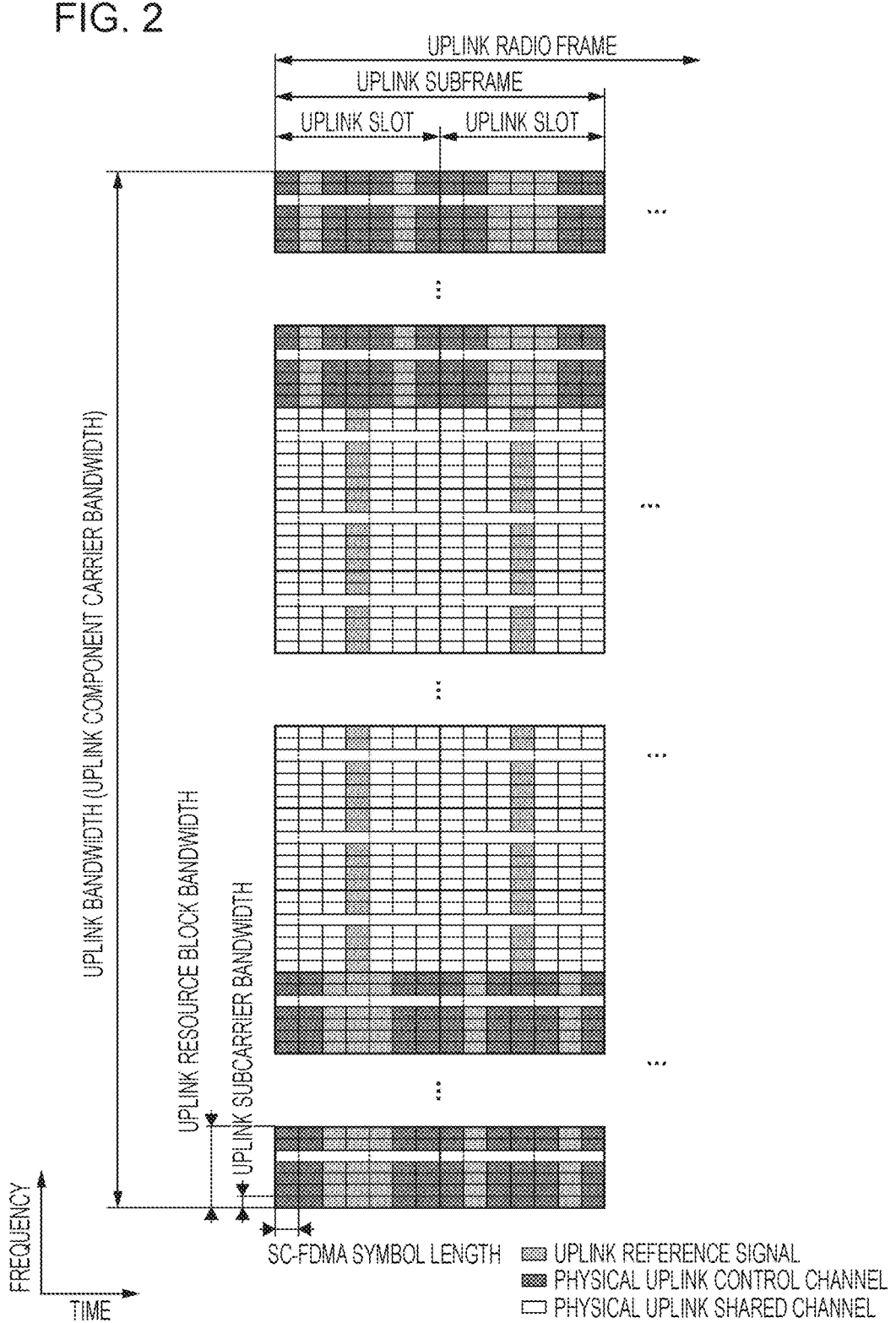
FIG. 2 is a diagram illustrating an example of a constitution of an uplink radio frame according to the first embodiment.

FIG. 2 is a diagram illustrating an example of a constitution of an uplink radio frame according to the present embodiment. For uplink, an SC-FDMA scheme is used. For uplink, a Physical Uplink Shared Channel (PUSCH), a PUCCH, and the like are allocated. Furthermore, an Uplink Reference Signal is allocated to a portion of the PUSCH or of the PUCCH. The uplink radio frame is constituted from an uplink RB pair. The uplink RB pair is a unit for assignment or the like of an uplink radio resource and is constructed from a frequency band (an RB bandwidth), which has a width that is determined in advance, and a time duration (two slots=one subframe). One uplink RB pair is constituted from two uplink RBs (RB bandwidth×slot) that is continuous in the time domain. One uplink RB is constituted from 12 subframes in the frequency domain. In the time domain, in the case where the normal cyclic prefix is attached, one uplink RB is constituted from seven SC-FDMA symbols, and, in the case where the cyclic prefix that is longer than usual is attached, is constituted from six SC-FDMA symbols. Moreover, here, an uplink subframe is imposed on one CC, but the uplink subframe is stipulated for every CC.

The synchronization signal is constituted from 3 types of primary synchronization signals and a secondary synchronization signal that is constituted from 31 types of codes which are alternately arranged in the frequency domain. With a combination of these signals, the primary synchronization signal and the secondary synchronization signal, 504 cell identifiers (Physical Cell Identity (Physical Cell ID) (PCI)) for identifying a base station apparatus and a frame timing for wireless synchronization are indicated. A terminal device specifies a physical cell ID of the synchronization signal that is received through cell search.

A Physical Broadcast Channel (PBCH) is transmitted for the purpose of notifying (configuring) a control parameter (broadcast information (system information)) that is used in a shared manner in terminal devices within a cell. A radio resource in which broadcast information is transmitted over the Physical Downlink Control Channel is notified to the terminal device within the cell, and for the broadcast information that is not notified over the Physical Broadcast Channel, in the notified radio resource, a layer 3 message (system information) that notifies the broadcast information over the Physical Downlink Shared Channel is transmitted.

As pieces of broadcast information, a Cell Global Identifier (CGI) indicating a cell-dedicated identifier, a Tracking Area Identifier (TAI) for managing a waiting area by paging, random access configuration information, transmission timing adjustment information (a transmission timing or the like), shared radio resource configuration information in the cell, neighboring cell information, uplink access limitation information, and the like are notified.

Downlink reference signals are categorized by their usage into multiple types. For example, the cell-specific RS (Cell-specific reference signals) is a pilot signal that is transmitted with a prescribed power for every cell, and is a downlink reference signal that is periodically iterated in the frequency domain and the time domain based on a prescribed rule. The terminal device measures reception quality for every cell by receiving the cell-specific RS. Furthermore, the terminal device uses the cell-specific RS also as a reference signal for demodulation of the Physical Downlink Control Channel that is transmitted at the same time as the cell-specific RS, or of the Physical Downlink Shared Channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as Channel State Information Reference Signals (CSI-RS). Furthermore, the downlink reference signal that is configured, in a dedicated manner, for the terminal device is referred to as UE-specific Reference Signals (URS), Demodulation Reference Signal (DMRS), or Dedicated RS (DRS), and is referred to for channel compensation processing of a channel, which is to be performed when demodulating Enhanced Physical Downlink Control Channel, or the Physical Downlink Shared Channel.

The Physical Downlink Control Channel (PDCCH) is transmitted in several OFDM symbols (for example, 1 to 4 OFDM symbols) starting from the head of each subframe. The Enhanced Physical Downlink Control Channel (EPDCCH) is a Physical Downlink Control Channel that is allocated to OFDM symbols to which the Physical Downlink Shared Channel (PDSCH) is allocated. The PDCCH or the EPDCCH is used for the purpose of notifying radio resource allocation information in accordance with the scheduling of the terminal device by the base station apparatus, or information indicating an amount of adjustment for an increase or decrease in transmit power. Unless otherwise specified, the Physical Downlink Control Channel (PDCCH) that will be described simply below means both of the physical channels, the PDCCH and the EPDCCH.

The terminal device monitors the Physical Downlink Control Channel that is destined for the terminal device itself before transmitting and receiving a layer 2 message and the layer 3 message (paging, a handover command, or the like) that are downlink data or higher layer control information, and receives the Physical Downlink Control Channel that is destined for the terminal device itself. Thus, the terminal device needs to acquire from the Physical Downlink Control Channel the radio resource allocation information that is referred to as an uplink grant at the time of the transmission and as a downlink grant (downlink assignment) at the time of the reception. Moreover, it is also possible that, in addition to being transmitted in the OFDM symbol described above, the Physical Downlink Control Channel is constituted to be transmitted in a region of a resource block that is allocated in a dedicated manner from the base station apparatus to the terminal device.

The Physical Uplink Control Channel (PUCCH) is used for an acknowledgement response (Hybrid Automatic Repeat reQuest-Acknowledgement (HARQ-ACK) or Acknowledgement/Negative Acknowledgement (ACK/NACK)), for reception of the downlink data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI includes a Channel Quality Indicator (CQI), a Precoding Matrix Indicator (PMI), a Precoding Type Indicator (PTI), and a Rank Indicator (RI), which can be used for designating (expressing) a suitable modulation scheme or coding rate, a suitable precoding matrix, a type of suitable PMI, and a suitable rank, respectively. Each indicator may be expressed as indication. Furthermore, CQIs and PMIs are categorized into wideband CQIs and PMIs on the presumption of the transmission that uses all resources within one cell, and subband CQIs and PMIs on the assumption of the transmission that uses some contiguous resource blocks (subbands) within one cell. Furthermore, when it comes to the PMI, a PMI of type that expresses one suitable precoding matrix using two types of PMIs, that is, a first PMI and a second PMI, as well as a PMI of normal type that expresses one suitable precoding matrix using one PMI, is present.

The Physical Downlink Shared Channel (PDSCH) is also used for notifying the terminal device of the broadcast information (the system information) that is not notified by the paging or over the physical broadcast channel, as the layer 3 message, in addition to the downlink data. The radio resource allocation information of the Physical Downlink Shared Channel is indicated with the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is also possible that uplink data and uplink control information are mainly transmitted over the Physical Uplink Shared Channel (PUSCH), and that the PUSCH includes uplink control information, such as the CSI or the ACK/NACK. Furthermore, the PUSCH is also used for the terminal device to notify the base station apparatus of the layer 2 message and the layer 3 message that are the higher layer control information, in addition to the uplink data. Furthermore, as is the case in the downlink, the radio resource allocation information of the Physical Uplink Shared Channel is indicated with the Physical Downlink Control Channel.

Included in the Uplink Reference Signal (which is also referred to as a pilot signal, or an uplink pilot channel) are the Demodulation Reference Signal (DMRS) that is used for the base station apparatus to demodulate the Physical Uplink Control Channel (PUCCH) and/or the Physical Uplink Shared Channel (PUSCH) and a Sounding Reference Signal (SRS) that is used for the base station apparatus to mainly estimate an uplink channel state. Furthermore, as Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station apparatus.

A Physical Random Access Channel (PRACH) is a channel that is used for notifying (configuring) a preamble sequence, and has a guard time. The preamble sequence is constituted in such a manner that information is notified to the base station apparatus with multiple sequences. For example, in a case where 64 types of sequences are prepared, 6-bit information can be indicated to the base station apparatus. The Physical Random Access Channel is used as means by which the terminal device has access to the base station apparatus.

The terminal device uses the Physical Random Access Channel in order to make the radio resource request in the uplink when the Physical Uplink Control Channel is not configured for the SR, make a request to the base station apparatus for transmission timing adjustment information (which is also referred to as a Timing Advance (TA) command) indispensable for adjusting an uplink transmission timing to a reception timing window of the base station apparatus, or so on. Furthermore, the base station apparatus can also make a request to the terminal device for starting of a random access procedure using the Physical Downlink Control Channel.

The layer 3 message is a message that is handled with a protocol of a control-plane (CP) (C-Plane) that is exchanged in radio resource control (RRC) layers of the terminal device and the base station apparatus. RRC signaling or an RRC message can be used synonymously. Moreover, in contrast with the control-plane, a protocol that is used to handle user data (the uplink data and the downlink data) is referred to as a user-plane (UP) (U-Plane). At this point, a transport block that is transmission data in a physical layer includes a C-plane message and U-plane data in a higher layer. Moreover, detailed descriptions of other physical channels are omitted.

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. When cells that are covered by different types of base station apparatuses or that have different radii are present in a mixed manner in an area where the same frequencies and/or different frequencies are available and one communication system is formed, this wireless network is referred to as a heterogeneous network.

The terminal device regards the inside of the cell as the communication area, and as such operates. When the terminal device moves from a certain cell to a different cell, the terminal device moves to a separate suitable cell according to a cell re-selection procedure at the time of a non-wireless connection (during non-communication) and according to a handover procedure at the time of a wireless connection (during communication). The suitable cell indicates a cell in which it is determined that, generally, the access by the terminal device is not disallowed based on information that is designated from the base station apparatus, and in which the reception quality of the downlink satisfies a prescribed condition.

Furthermore, a technology in which frequencies (component carriers or frequency bands) in multiple different frequency bands are aggregated by carrier aggregation and are handled as if they were one frequency (frequency band) may be applied to the terminal device and the base station apparatus. As component carriers, there are an uplink component carrier that corresponds to the uplink and a downlink component carrier that corresponds to the downlink. In the present specification, the frequency and the frequency band can be used synonymously.

For example, in a case where, with the carrier aggregation, a frequency bandwidth is obtained by aggregating five 20 MHz component carriers, the terminal device that has the capability for the carrier aggregation performs transmission and reception, regarding these as a 100 MHz frequency bandwidth. Moreover, although the component carries to be aggregated are contiguous frequencies, some or all of the component carriers may be non-contiguous frequencies. For example, in a case where available frequency bands are an 800 MHz band, a 2 GHz band, and a 3.5 GHz band, one component carrier may be transmitted in the 800 MHz band, another component in the 2 GHz band, and a third component in the 3.5 GHz band.

Furthermore, it is also possible that multiple component carriers that are the same frequency bands which are contiguous or non-contiguous are aggregated. A frequency bandwidth of each component may be a frequency bandwidth (for example, 5 MHz or 10 MHz) smaller than a frequency bandwidth (for example, 20 MHz) in which the terminal device is capable of performing reception, and the frequency bandwidths to be aggregated may be different from each other. It is desirable that the frequency bandwidth is equal to any one of the frequency bandwidths in a cell in the related art, considering backward compatibility, but the frequency bandwidth may be a frequency bandwidth that is different from the frequency band in the cell in the related art.

Furthermore, component carriers (career types) may be aggregated that do not have the backward compatibility. Moreover, it is desirable that the number of uplink component carriers that are allocated to (configured for or added to) the terminal device by the base station apparatus is equal to or smaller than the number of downlink component carriers.

A cell that is constituted from an uplink component carrier on which configuration of an uplink control channel for the radio resource request is performed, and a downlink component carrier that is connected, in a cell-specific manner, to the uplink component carrier is referred to a primary cell (PCell). Furthermore, a cell that is constituted from component carriers other than those from which the primary cell is constituted is referred to as a secondary cell (SCell). The terminal device may perform reception of a paging message, detection of update of the broadcast information, an initial access procedure, configuration of security information, and the like, in the primary cell, and on the other hand, may not perform these operations in the secondary cell.

The primary cell is other than a target for control of activation and deactivation (more precisely, the primary cell is regarded as being necessarily activated). In contrast, the secondary cell retains a state of being activated and a state of being deactivated. A change of these states is explicitly designated from the base station apparatus, but the state is changed based on a timer that is configured for the terminal device for every component carrier. The primary cell and the secondary cell are collectively referred to as a serving cell.

Moreover, the carrier aggregation is for communication in multiple cells that use multiple component carriers (frequency bands), and is also referred to as cell aggregation. Moreover, the terminal device may be wirelessly connected to the base station apparatus through a relay station apparatus (or a repeater) for every frequency. That is, the base station apparatus according to the present embodiment can also be replaced with the relay station apparatus.

The base station apparatus manages a certain cell that is an area where it is possible that the terminal device communicates with the base station apparatus itself, from one frequency to another. One base station apparatus manages multiple cells. Cells are categorized into multiple types according to the size (cell size) of an area where communication with the terminal device is possible. For example, cells are categorized into macro cells and small cells. Additionally, the small cells are categorized into femto cells, pico cells, and nano cells according to their coverage areas. Furthermore, when it is possible that the terminal device communicates with a certain base station apparatus, among cells that are covered by the certain base station apparatus, a cell that is configured in such a manner that the cell is used for communication with the terminal device is referred to as a serving cell, and the other cells that are not used for the communication are referred to as neighboring cells.

In other words, in the carrier aggregation, multiple serving cells that are configured include one primary cell and one or multiple secondary cells.

The primary cell is a serving cell in which an initial connection establishment procedure is performed, a serving cell in which a connection re-establishment procedure is started, or a cell that is indicated as a primary cell during a handover procedure. The primary cell operates at a primary frequency. At a point of time at which a connection is (re-)established, or thereafter, the secondary cell may be configured. The secondary cell operates at a secondary frequency. Moreover, the connection may be referred to as an RRC connection. Aggregation is performed for the terminal device that supports the CA, in one primary cell and one or more secondary cells.

Figure 3:
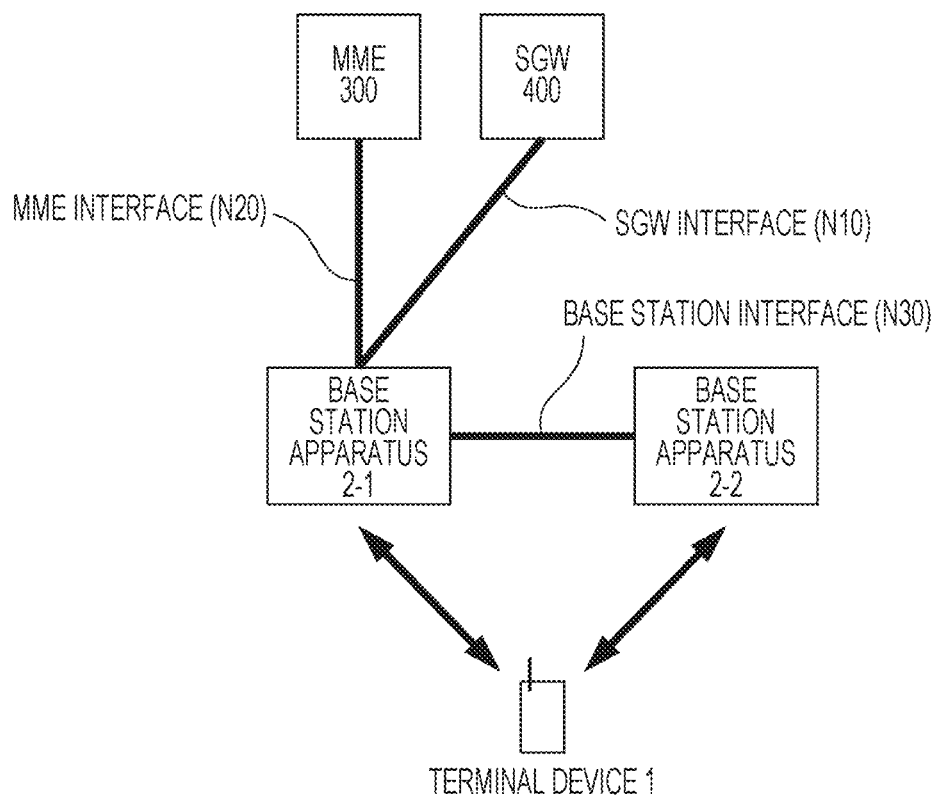
FIG. 3 is a diagram illustrating a basic architecture of dual connectivity according to the first embodiment.
Figure 4:
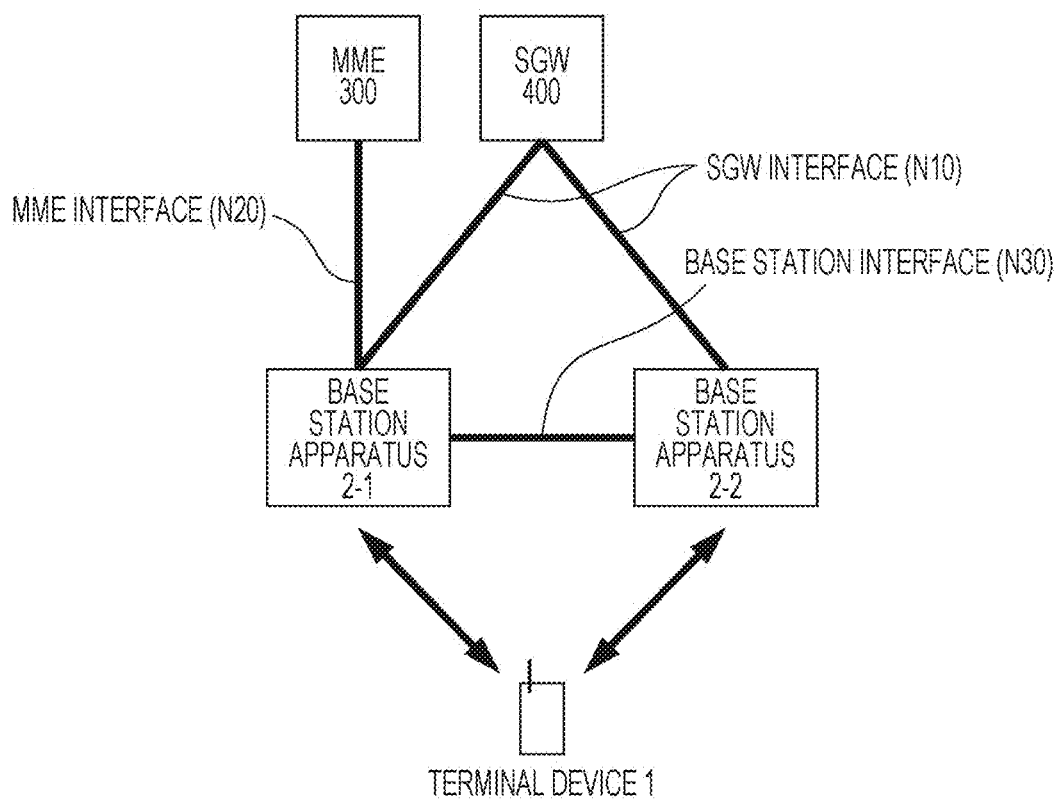
FIG. 4 is a diagram illustrating the basic architecture of the dual connectivity according to the first embodiment.

A basic architecture of dual connectivity is described referring to FIGS. 3 and 4. FIGS. 3 and 4 illustrate that a terminal device 1 makes connections to multiple base station apparatuses 2 (which are indicated as a base station apparatus 2-1 and a base station apparatus 2-2 in FIGS. 3 and 4) at the same time. The base station apparatus 2-1 is assumed to be a base station apparatus that constitutes a macro cell, and the base station apparatus 2-2 is assumed to be a base station apparatus that constitutes a small cell. In this manner, the terminal device 1 making connections at the same time using multiple cells that belong to multiple base station apparatuses 2 is referred to as dual connectivity. The cells that belong to each base station apparatus 2 may be managed with the same frequency, and may be managed with different frequencies.

Moreover, the carrier aggregation is different from the dual connectivity in that the base station apparatus 2 manages multiple cells and a frequency differs from one cell to another. In other words, the carrier aggregation is a technology that connects one terminal device 1 and one base station apparatus 2 through multiple cells that differ in frequency, and in contrast with this, the dual connectivity is a technology that connects one terminal device 1 and multiple base station apparatus 2 through multiple cells that are the same in frequency or differ in frequency.

The terminal device 1 and the base station apparatus 2 can apply the technology that is applied to the carrier aggregation to the dual connectivity. For example, the terminal device 1 and the base station apparatus 2 may apply technologies, such as allocation of the primary cell and the secondary cell and activation/deactivation, to a cell that is connected using the dual connectivity.

In FIGS. 3 and 4, the base station apparatus 2-1 or the base station apparatus 2-2 makes a connection to an MME 300 and an SGW 400 through a backbone line. The MME 300 is a high-level control station apparatus that corresponds to a Mobility Management Entity (MME), and assumes the role of performing mobility management of authentication control (security control) of the terminal device 1 and configuring a user data path to the base station apparatus 2, and the like. The SGW 400 is a higher-level control station apparatus that corresponds to a Serving Gateway (S-GW), and assumes the role of transferring user data along the user data path to the terminal device 1 that is configured by the MME 300, and the like.

Furthermore, in FIGS. 3 and 4, a connection path between the base station apparatus 2-1 or the base station apparatus 2-2, and the SGW 400 is referred to as an SGW interface N10. Furthermore, a connection path between the base station apparatus 2-1 or the base station apparatus 2-2, and the MME 300 is referred to as an MME interface N20. Furthermore, a connection path between the base station apparatus 2-1 and the base station apparatus 2-2 is referred to as a base station interface N30. The SGW interface N10 is also referred to as an S1-U interface in EUTRA. Furthermore, the MME interface N20 is also referred to as an S1-MME interface in EUTRA. Furthermore, the base station interference N30 is also referred to as an X2 interface in EUTRA.

A constitution as illustrated in FIG. 3 can be employed as an architecture that realizes the dual connectivity. In FIG. 3, a connection is made between the base station apparatus 2-1 and the MME 300 using the MME interface N20. Furthermore, a connection is made between the base station apparatus 2-1 and the SGW 400 using the SGW interface N10. Furthermore, the base station apparatus 2-1 provides a communication path to the MME 300 and/or the SGW 400 to the base station apparatus 2-2 through the base station interface N30. In other words, the base station apparatus 2-2 makes a connection to the MME 300 and/or the SGW 400 through the base station apparatus 2-1.

Furthermore, a constitution as illustrated in FIG. 4 can be employed as another architecture that realizes the dual connectivity. In FIG. 4, a connection is made between the base station apparatus 2-1 and the MME 300 using the MME interface N20. Furthermore, the connection is made between the base station apparatus 2-1 and the SGW 400 using the SGW interface N10. The base station apparatus 2-1 provides the communication path to the MME 300 to the base station apparatus 2-2 through the base station interface N30. In other words, the base station apparatus 2-2 makes a connection to the MME 300 through the base station apparatus 2-1. Furthermore, the base station apparatus 2-2 makes a connection to the SGW 400 through the SGW interface N10.

Moreover, a constitution may be employed in which a direct connection is made between the base station apparatus 2-2 and the MME 300 using the MME interface N20.

From a different point of view, the dual connectivity is described as an operation in which a prescribed terminal device consumes radio resources which are provided by at least two different network points (a master base station apparatus (Master eNB (MeNB) and a secondary base station apparatus (Secondary eNB (SeNB)). In other words, the dual connectivity is that the terminal device performs an RRC connection through at least two network points. In the dual connectivity, the terminal device may make a connection in an RRC_CONNECTED state and with non-ideal backhaul.

In the dual connectivity, the base station apparatus that makes a connection at least to the S1-MME and that plays the role of a mobility anchor of a core network is referred to as the master base station apparatus. Furthermore, the base station apparatus that is not the master base station apparatus that provides an additional radio resource to the terminal device is referred to as the secondary base station apparatus. In some cases, a group of serving cells that are associated with the master base station apparatus and a group of serving cells that are associated with the secondary base station apparatus are also referred to as a Master Cell Group (MCG) and a Secondary Cell Group (SCG), respectively. Moreover, the cell group may be a serving cell group.

In the dual connectivity, the primary cell belongs to the MCG. Furthermore, in the SCG, the secondary cell that is equivalent to the primary cell is referred to as a primary secondary cell (pSCell). Moreover, in some cases, the pSCell is referred to as a special cell or a Special Secondary Cell (Special SCell). In the Special SCell (the base station apparatus that constitutes the Special SCell), one or several functions (for example, a function of transmitting and receiving the PUCCH and the like) of the PCell (the base station apparatus that constitute the PCell) may be supported. Furthermore, in the pSCell, only one or several functions of the PCell may be supported. For example, in the pSCell, a function of transmitting the PDCCH may be supported. Furthermore, in the pSCell, a function of performing PDCCH transmission may be supported using a search space that is different from a CSS or a USS. For example, as search spaces that are different from the USS, there are a search space that is determined based on a value that is stipulated in a specification, a search space that is determined based on an RNTI which is different from a C-RNTI, a search space that is determined based on a value that is configured in a higher layer, which is different from the RNTI, and the like. Furthermore, the pSCell may be at all times in an activated state. Furthermore, the pSCell may be a cell that can receive the PUCCH.

In the dual connectivity, a Date Radio Bearer (DRB) may be allocated in a dedicated manner in the MeNB and the SeNB. On the other hand, a Signalling Radio Bearer (SRB) may be allocated to the MeNB. In the dual connectivity, in the MCG and the SCG or in the PCell or the pSCell, a duplex mode may be configured in a dedicated manner for each. In the dual connectivity, in the MCG and the SCG or in the PCell or the pSCell, synchronization may not be established. In the dual connectivity, multiple parameters (Timing Advance Group (TAG)) for timing adjustment are configured for each of the MCG and SCG. More precisely, it is possible that the terminal device performs uplink transmission at multiple different timings within each CG.

In the dual connectivity, the terminal device can transmit UCI that corresponds to a cell within the MCG, only to the MeNB (the PCell) and can transmit UCI that corresponds to a cell within the SCG, only to the SeNB (the pSCell). For example, the UCI is an SR, a HARQ-ACK, and/or CSI. Furthermore, each time the UCI is transmitted, a transmission method that uses the PUCCH and/or the PUSCH is applied in each of the cell groups.

In the primary cell, it is possible that all signals are transmitted and received, but in the secondary cell, there is a signal that is difficult to transmit and receive. For example, the Physical Uplink Control Channel (PUCCH) is transmitted only in the primary cell. Furthermore, the Physical Random Access Channel (PRACH) is transmitted only in the primary cell as long as multiple Timing Advance Groups (TAG) are not configured. Furthermore, the Physical Broadcast Channel (PBCH) is transmitted only in the primary cell. Furthermore, a Master Information Block (MIB) is transmitted only in the primary cell. In the primary secondary cell, a signal that is possible to transmit and receive in the primary cell is transmitted and received. For example, the PUCCH may be transmitted in the primary secondary cell. Furthermore, regardless of whether or not multiple TAGs are configured, the PRACH may be transmitted in the primary secondary cell. Furthermore, the PBCH or the MIB may be transmitted in the primary secondary cell.

In the primary cell, a Radio Link Failure (RLF) is detected. In the secondary cell, although a condition for detecting the RLF is set up, it is not recognized that the RLF is detected. In the primary secondary cell, if the condition is satisfied, the RLF is detected. In the primary secondary cell, in a case where the RLF is detected, a higher layer of the primary secondary cell notifies a higher layer of the primary cell that the RLF is detected. In the primary cell, Semi-Persistent Scheduling (SPS) or Discontinuous Transmission (DRX) may be performed. In the secondary cell, the DRX may be performed in the manner as in the primary cell. A parameter/information relating to a MAC configuration in the secondary cell is used in a shared manner in the primary cell/primary secondary cell in the same cell group. One or several parameters (for example, STAG-Id) may be configured for every secondary cell. One or several timers or counters may be applied only to the primary cell and/or the primary secondary cell. The timer or counter to be applied may be applied only to the secondary cell.

Figure 5:
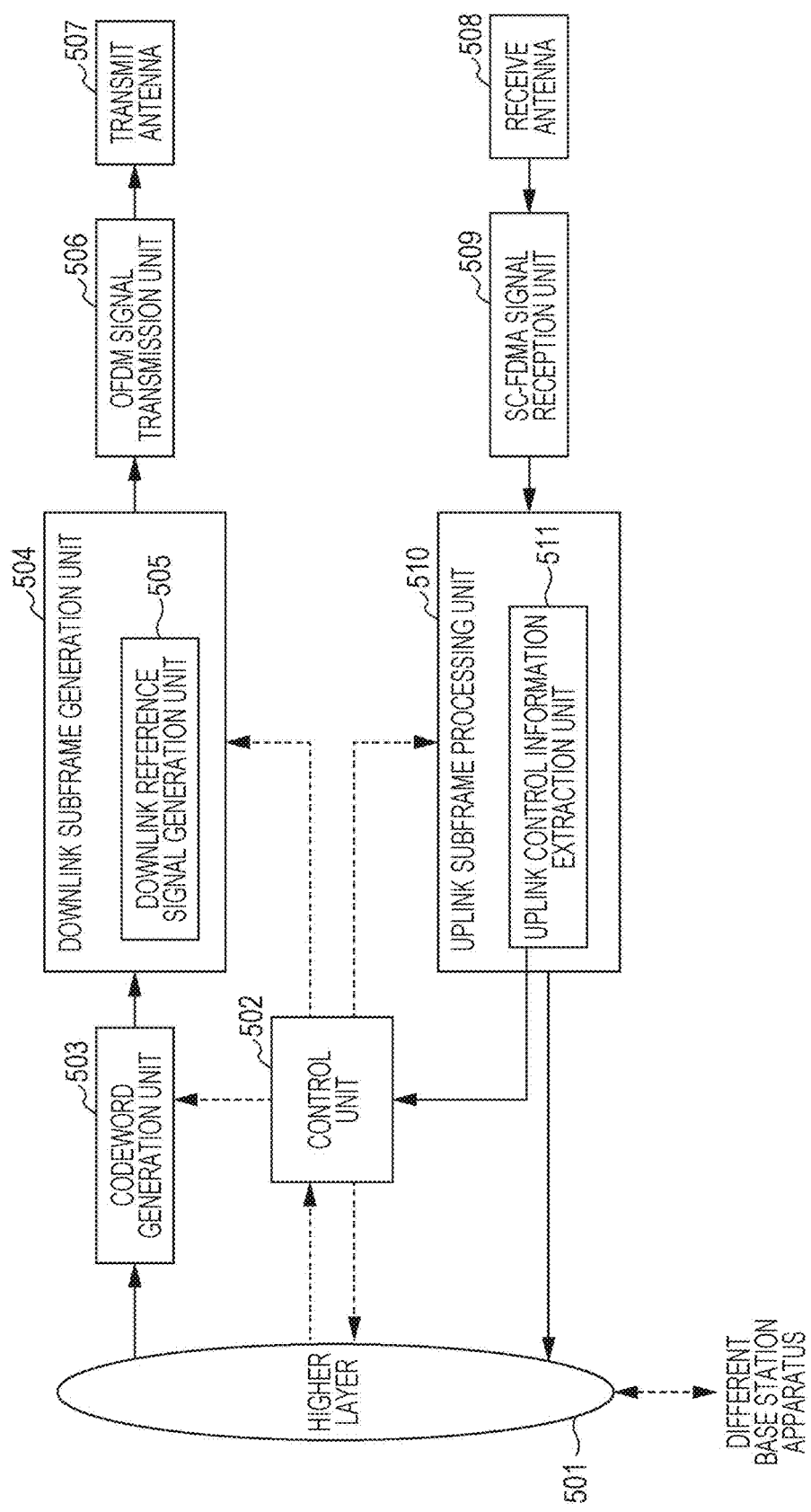
FIG. 5 is a diagram illustrating an example of a block constitution of a base station apparatus according to the first embodiment.

FIG. 5 is a schematic diagram illustrating an example of block constitutions of the base station apparatus 2-1 and the base station apparatus 2-2 according to the present embodiment. The base station apparatus 2-1 and the base station apparatus 2-2 each have a higher layer (a higher layer control information notification unit) 501, a control unit (a base station control unit) 502, a codeword generation unit 503, a downlink subframe generation unit 504, an OFDM signal transmission unit (a downlink transmission unit) 506, a transmit antenna (a base station transmit antenna) 507, a receive antenna (a base station receive antenna) 508, an SC-FDMA signal reception unit (a CSI reception unit) 509, and an uplink subframe processing unit 510. The downlink subframe generation unit 504 has a downlink reference signal generation unit 505. Furthermore, the uplink subframe processing unit 510 has an uplink control information extraction unit (a CSI acquisition unit) 511.

Figure 6:
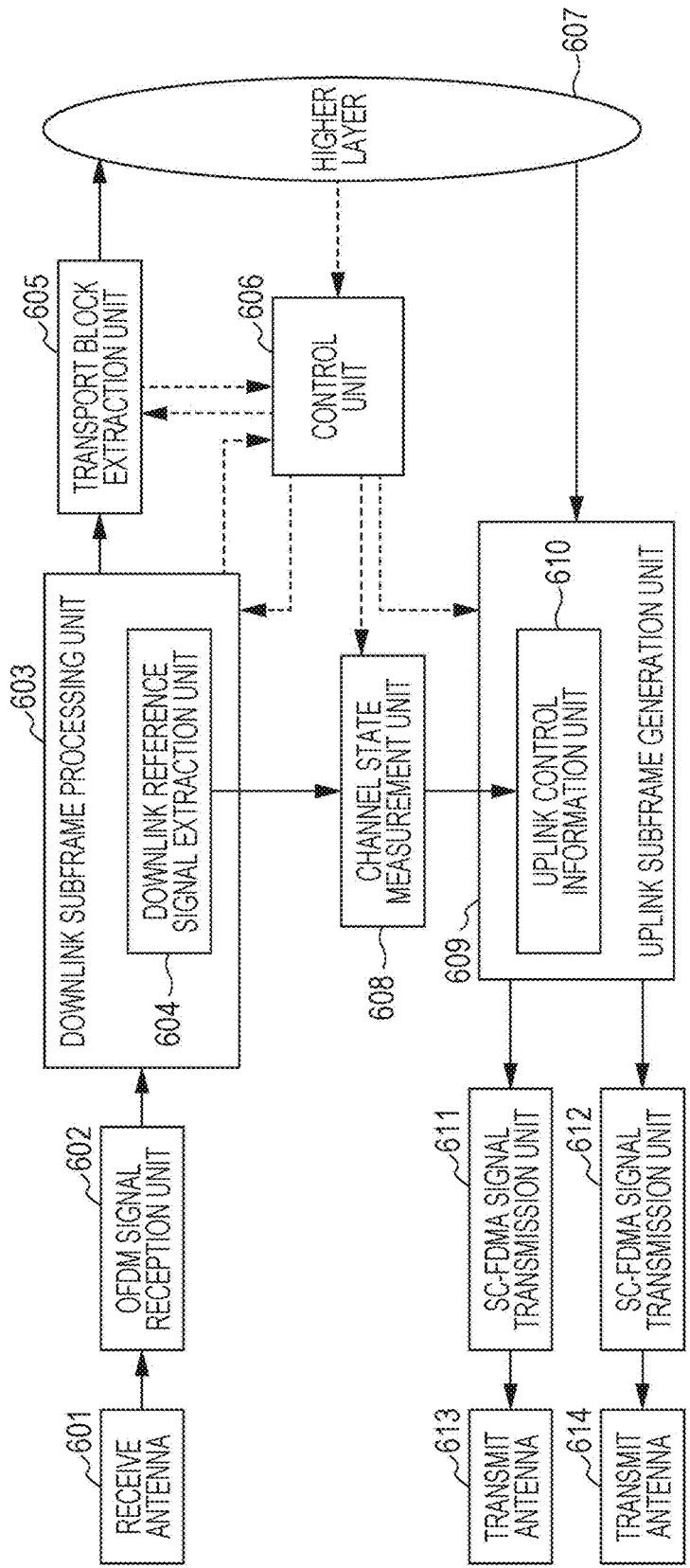
FIG. 6 is a diagram illustrating an example of a block constitution of a terminal device according to the first embodiment.

FIG. 6 is a schematic diagram illustrating an example of a block constitution of the terminal device 1 according to the present embodiment. The terminal device 1 has a receive antenna (a terminal receive antenna) 601, an OFDM signal reception unit (a downlink reception unit) 602, a downlink subframe processing unit 603, a transport block extraction unit (a data extraction unit) 605, a control unit (a terminal control unit) 606, a higher layer (a higher layer control information acquisition unit) 607, a channel state measurement unit (a CSI generation unit) 608, an uplink subframe generation unit 609, SC-FDMA signal transmission units (UCI transmission units) 611 and 612, and transmit antennas (terminal transmission antennas) 613 and 614. The downlink subframe processing unit 603 has a downlink reference signal extraction unit 604. Furthermore, the uplink subframe generation unit 609 has an uplink control information generation unit (a UCI generation unit) 610.

First, a flow of transmission and reception of the downlink data is described referring FIGS. 5 and 6. In the base station apparatus 2-1 or the base station apparatus 2-2, the control unit 502 retains a Modulation and Coding Scheme (MCS) indicating a modulation scheme, a coding rate, and the like in the downlink, downlink resource assignment indicating an RB which is used for data transmission, and information (a redundancy version, a HARQ process number, or a new data index) that is used for HARQ control, and controls the codeword generation unit 503 or the downlink subframe generation unit 504 based on these pieces of information. An error correction coding, a rate matching processing, and the like are performed on downlink data (which is also referred to as a downlink transport block) that is sent from the higher layer 501, in the codeword generation unit 503 under the control of the control unit 502, and a codeword is generated. Two codewords at the maximum are transmitted at the same time in one subframe in one cell. In the downlink subframe generation unit 504, a downlink subframe is generated according to an instruction of the control unit 502. First, modulation processing, such as Phase Shift Keying (PSK) modulation or Quadrature Amplitude Modulation (QAM) modulation is performed on the codeword that is generated in the codeword generation unit 503, and the resulting codeword is converted into a sequence of modulation symbols. Furthermore, the sequence of modulation symbols is mapped onto REs within one or several RBs, and the downlink subframe is generated for every antenna port by performing precoding processing. At this time, a sequence of pieces of transmission data that is sent from the higher layer 501 includes higher layer control information (for example, an exclusive (dedicated) Radio Resource Control (RRC) signalling) that is control information in the higher layer. Furthermore, in the downlink reference signal generation unit 505, a downlink reference signal is generated. According to the instruction of the control unit 502, the downlink subframe generation unit 504 maps the downlink reference signal onto REs within the downlink subframe. The downlink subframe that is generated in the downlink subframe generation unit 504 is modulated into an OFDM signal in the OFDM signal transmission unit 506, and is transmitted through the transmit antenna 507. Moreover, at this point, a constitution that includes one OFDM signal transmission unit 506 and one transmit antenna 507 is illustrated, but in a case where the downlink subframe is transmitted using multiple antenna ports, a constitution that includes multiple OFDM signal transmission units 506 and multiple transmit antennas 507 may be employed. Furthermore, the downlink subframe generation unit 504 can also have the capability to generate a downlink control channel of the physical layer, such as the PDCCH or the EPDCCH and to map the generated downlink control channel onto the REs within the downlink subframe. Multiple base station apparatuses (the base station apparatus 2-1 and the base station apparatus 2-2) transmit their respective dedicated downlink subframes.

In the terminal device 1, the OFDM signal is received in the OFDM signal reception unit 602 through the receive antenna 601, and OFDM demodulation processing is performed. The downlink subframe processing unit 603 first detects the downlink control channel of the physical layer, such as the PDCCH or the EPDCCH. More specifically, the downlink subframe processing unit 603 performs decoding, with the PDCCH or the EPDCCH as being transmitted in a region to which the PDCCH or the EPDCCH can be allocated, and checks for a Cyclic Redundancy Check (CRC) bit that is attached in advance (blind decoding). That is, the downlink subframe processing unit 603 monitors the PDCCH or the EPDCCH. In a case where the CRC bit is consistent with an ID (one terminal-specific identifier that is assigned to one terminal, such as a Cell-Radio Network Temporary Identifier (C-RNTI) or a Semi Persistent Scheduling-C-RNTI (SPS-C-RNTI), or a Temporaly C-RNTI) that is allocated in advance by the base station apparatus, the downlink subframe processing unit 603 recognizes that the PDCCH or the EPDCCH can be detected and extracts the PDSCH using the control information that is included in the PDCCH or the EPDCCH that is detected. The control unit 606 retains the MCS indicating the modulation scheme, the coding rate, and the like in the downlink, which is based on the control information, the downlink resource assignment indicating an RB that is used for downlink data transmission, and the information that is used for the HARQ control, and controls the downlink subframe processing unit 603, the transport block extraction unit 605, or the like based on these pieces of information. More specifically, the control unit 606 performs the control in such a manner that RE demapping processing or demodulation processing that corresponds to RE mapping processing or modulation processing, respectively, in the downlink subframe generation unit 504 is performed. The PDSCH that is extracted from the received downlink subframe is sent to the transport block extraction unit 605. Furthermore, the downlink reference signal extraction unit 604 within the downlink subframe processing unit 603 extracts the downlink reference signal from the downlink subframe. In the transport block extraction unit 605, the rate matching processing and the error correction coding that correspond to the rate matching processing and the error correction coding, respectively, in the codeword generation unit 503 are performed, the transport block is extracted, and the extracted transport block is sent to the higher layer 607. The higher layer control information is included in the transport block, and, based on the higher layer control information, the higher layer 607 informs the control unit 606 of an indispensable physical layer parameter. Moreover, multiple base station apparatuses 2 (the base station apparatus 2-1 and base station apparatus 2-2) transmit their respective dedicated downlink subframes. In order to receive these downlink subframes, the terminal device 1 may perform the processing described above on the downlink subframe that is transmitted by each of the multiple base station apparatuses 2. At this time, the terminal device 1 may recognize or may not recognize that multiple downlink subframes are transmitted from multiple base station apparatuses 2, respectively. If not, the terminal device 1 may recognize simply only that multiple downlink subframes are transmitted in multiple cells, respectively. Furthermore, in the transport block extraction unit 605, it is determined whether or not the transport block can correctly be detected, and a result of the determination is sent to the control unit 606.

Next, a flow of transmission and reception of an uplink signal is described. In the terminal device 1, according to the instruction of the control unit 606, the downlink reference signal that is extracted in the downlink reference signal extraction unit 604 is sent to the channel state measurement unit 608. In the channel state measurement unit 608, a channel state and/or interference is measured, and, based on the channel state and/or the interference that is measured, the CSI is calculated. Furthermore, based on a result of determining whether or not the transport block can correctly be detected, the control unit 606 instructs the uplink control information generation unit 610 to generate a HARQ-ACK (DTX (not transmitted), an ACK (detection success) or an NACK (detection failure)) and to perform the mapping of the generated HARQ-ACK onto the downlink subframe. The terminal device 1 performs these processing operations on the downlink subframe in each of the multiple cells. In the uplink control information generation unit 610, the PUCCH is generated that includes the calculated CSI and/or the HARQ-ACK. In the uplink subframe generation unit 609, the PUSCH that includes the uplink data which is sent from the higher layer 607, and the PUCCH that is generated in the uplink control information generation unit 610 are mapped onto RBs within an uplink subframe, and the uplink subframe is generated. At this point, the PUCCH and the uplink subframe that includes the PUCCH are generated for every connectivity group (which is referred to as a serving cell group or a cell group). Moreover, the connectivity group will be described in detail below. At this point, two connectivity groups are assumed, and are assumed to correspond to the base station apparatus 2-1 and the base station apparatus 2-2, respectively. When it comes to one uplink subframe (for example, the uplink subframe that is transmitted to the base station apparatus 2-1) in one connectivity group, in the SC-FDMA signal transmission unit 611, an SC-FDMA signal on which the SC-FDMA modulation is performed is generated, and the generated SC-FDMA signal is transmitted through the transmit antenna 613. When it comes to the other uplink subframe (for example, the uplink subframe that is transmitted to the base station apparatus 2-2) in one connectivity group, in the SC-FDMA signal transmission unit 612, an SC-FDMA signal on which the SC-FDMA modulation is performed is generated, and the generated SC-FDMA signal is transmitted through the transmit antenna 614. Furthermore, the uplink subframe in two or more connectivity groups can be transmitted at the same time using one subframe.

In each of the base station apparatus 2-1 and the base station apparatus 2-2, the uplink subframe in one connectivity group is received. Specifically, the SC-FDMA signal is received in the SC-FDMA signal reception unit 509 through the receive antenna 508, and SC-FDMA demodulation processing is performed. In the uplink subframe processing unit 510, according to an instruction of the control unit 502, the RB onto which the PUCCH is mapped is extracted, and the CSI that is included in the PUCCH is extracted in the uplink control information extraction unit 511. The extracted CSI is sent to the control unit 502. The CSI is used for the control of a downlink transmission parameter (the MCS, the downlink resource assignment, the HARQ, or the like) by the control unit 502.

Figure 7:
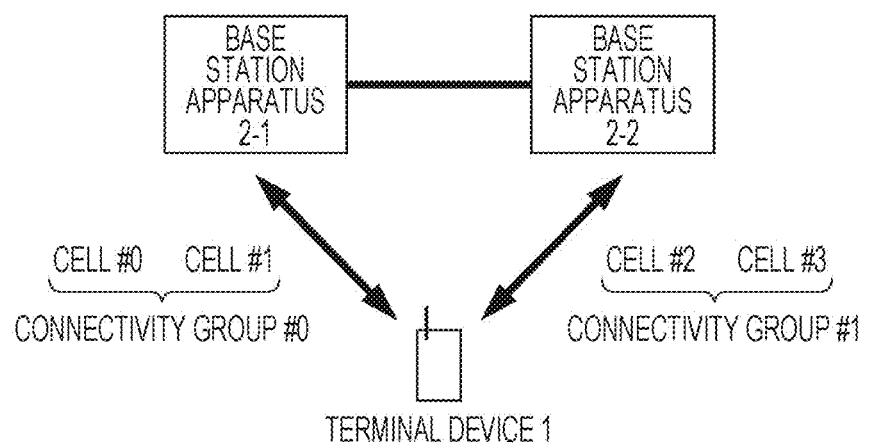
FIG. 7 is a diagram illustrating an example of a connectivity group according to the first embodiment.

FIG. 7 illustrates an example of the connectivity group (the cell group). The base station apparatus 2-1 and the base station apparatus 2-2, and the terminal device 1 perform communication in multiple serving cells (cell #0, cell #1, cell #2, and cell #3). Cell #0 is a primary cell, and the other cells, that is cell #1, cell #2, and cell #3 are secondary cells. Four cells are actually covered (provided) by two different base station apparatuses, that is, the base station apparatus 2-1, and the base station apparatus 2-2. Cell #0 and cell #1 are covered by the base station apparatus 2-1, and cell #2 and cell #3 are covered by the base station apparatus 2-2. Serving cells are divided into multiple groups, and each group is referred to as a connectivity group. At this point, serving cells that straddle low-speed backhaul may be grouped into different groups, and serving cells that can use high-speed backhaul, or serving cells that do not need to use backhaul because they are provided using the same apparatus may be grouped into the same group. A serving cell in a connectivity group to which the primary cell belongs can be referred to as a master cell, and a serving cell in the other connectivity groups can be referred to as an assistant cell. Furthermore, one serving cell (for example, a serving cell that has the smallest cell index in the connectivity group) can be referred to as a primary secondary cell or a PS cell (which is also expressed to as a pSCell) for short. Moreover, each serving cell within the connectivity has component carriers at different carrier frequencies. On the other hand, serving cells in different connectivity groups can have component carriers at different carrier frequencies, and can have component carriers at the same carrier frequency (the same carrier frequency is configurable). For example, carrier frequencies of an uplink component carrier and a downlink component carrier that cell #1 has are different from those in cell #0. On the other hand, carrier frequencies of an uplink component carrier and a downlink component carrier that cell #2 includes may be different from those in cell #0 or may be the same as those in cell #0. Furthermore, it is preferable that an SR is transmitted to every connectivity group. A serving cell group that includes the primary cell can be referred to as a Master Cell Group and a serving cell group that does not include the primary cell (that includes the primary secondary cell) can be referred to as a secondary group.

Moreover, the terminal device 1 and the base station apparatus 2, for example, can use any method among (1) to (5) that follow, as a method of grouping serving cells. Moreover, the connectivity group may be configured using methods other than (1) to (5).

(1) A value of a connectivity identifier is configured for each serving cell, and the serving cells for which the same value of the connectivity identifier is configured are regarded as being in a group. Moreover, a prescribed value (for example, 0) may be used without configuring a value of a connectivity identifier of the primary cell.

(2) The value of the connectivity identifier is configured for each serving cell, and the secondary cells for which the same value of the connectivity identifier is configured are regarded as being in a group. Furthermore, the secondary cells for which the value of the connectivity identifier is not configured are regarded as being in the same group as the primary cells.

(3) A value of an SCell Timing Advanced Group (STAG) identifier is configured for each secondary cell, and the secondary cells for which the same STAG identifier is configured are regarded as being in a group. Furthermore, the secondary cell for which the STAG identifier is not configured are regarded as being in the same group as the primary cell. Moreover, this group and a group for making a timing adjustment of the uplink transmission with respect to downlink reception are used in an exchangeable manner.

(4) Any value among 1 to 7 is configured, as a secondary cell index (a serving cell index), for each secondary cell. The serving cell index is assumed to be 0 for the primary cell. The group division is performed based on these serving cell indexes. For example, in a case where the secondary cell indexes range from 1 to 4, the secondary cells are regarded as being in the same group as the primary cell, and on the other hand, in a case where the secondary cell indexes range from 5 to 7, the secondary cells can be regarded as being in a group different from the group to which the primary cell belongs.

(5) Any value among 1 to 7 is configured, as the secondary cell index (the serving cell index), for each secondary cell. The serving cell index is assumed to be 0 for the primary cell. Furthermore, the serving cell index of the cell that belongs to each group is notified by the base station apparatus 2. At this point, the connectivity identifier, the STAG identifier, or the secondary cell index may be configured, by the base station apparatus 2-1 or the base station apparatus 2-2, for terminal device 1, using dedicated RRC signaling.

Figure 8:
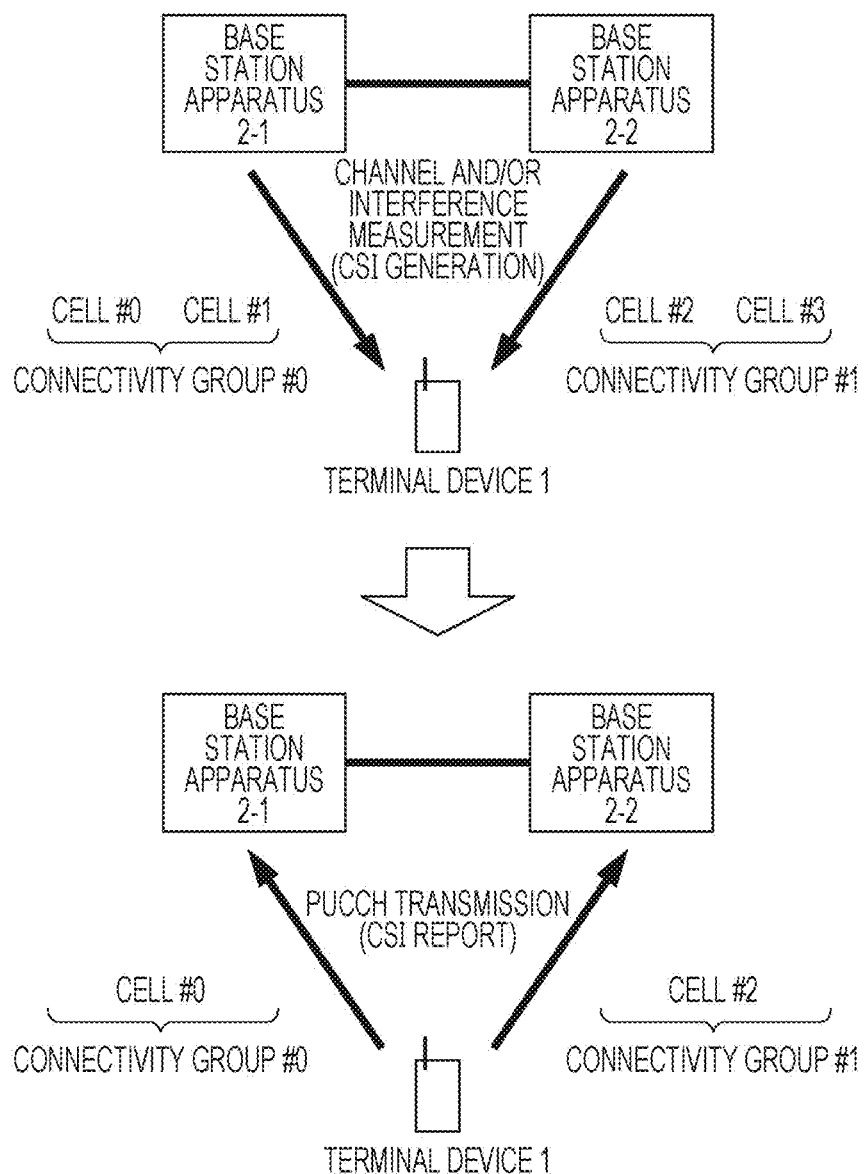
FIG. 8 is a diagram illustrating an example of generation and report of CSI in the connectivity group according to the first embodiment.

FIG. 8 illustrates an example of generation and report of the CSI in the connectivity group for the terminal device 1. The base station apparatus 2-1 and/or the base station apparatus 2-2 configures a parameter of the downlink reference signal for the terminal device 1 in each serving cell, and transmits the downlink reference signal in each serving cell that is provided. The terminal device 1 receives the downlink reference signal in each serving cell, and a channel measurement and/or an interference measurement is performed. Moreover, the downlink reference signal here can include a CRS, a non-zero power CSI-RS, and a zero power CSI-RS. Preferably, the terminal device 1 performs the channel measurement using the non-zero power CSI-RS, and performs the interference measurement using the zero power CSI-RS. Additionally, based on a result of the channel measurement and a result of the interference measurement, the RI indicating a suitable rank, the PMI indicating a suitable precoding matrix, or the CQI that has the highest index which corresponds to a modulation scheme and a coding rate which satisfy demanded quality (which, for example, means that transport block error rate does not exceed 0.1) in a reference resource is calculated.

Next, the terminal device 1 reports the CSI. At this time, the CSI of each serving cell that belongs to the connectivity group is reported using an uplink resource (a PUCCH resource or a PUSCH resource) in the cell in this connectivity group. Specifically, in a certain subframe, the CSI of cell #0 and the CSI of cell #1 are transmitted using the PUCCH of cell #0 that is not only the PS cell in connectivity group #0, but also the primary cell. Furthermore, in a certain subframe, the CSI of cell #0 and the CSI of cell #1 are transmitted using the PUSCH of any one cell that belongs to the connectivity group #0. Furthermore, in a certain subframe, the CSI of cell #2 and the CSI of cell #3 are transmitted using the PUCCH of cell #2 that is the PS cell in connectivity group #1. Furthermore, in a certain subframe, the CSI of cell #2 and the CSI of cell #3 are transmitted using the PUSCH of any one cell that belongs to connectivity group #1. In a sense, each PS cell can perform a portion (for example, transmission of the CSI that uses the PUCCH) of a primary cell function in the carrier aggregation in the related art. A CSI report on the serving cell within each connectivity group is conducted in the same manner as a CSI report for the serving cell in the carrier aggregation.

The PUCCH resource for a periodic CSI of the serving cell that belongs to a certain connectivity group is configured for the PS cell in the same connectivity group. The base station apparatus 1 transmits information for configuring the PUCCH resource for the periodic CSI in the PS cell to the terminal device 1. In a case where the information for configuring the PUCCH resource for the periodic CSI in the PS cell is received, the terminal device 1 performs a report of the periodic CSI using this PUCCH resource. The base station apparatus 1 does not transmit information for configuring the PUCCH resource for the periodic CSI in the PS cell to the terminal device 1. In a case where the information for configuring the PUCCH resource for the periodic CSI in a cell other than the PS cell is received, the terminal device 1 performs error handling and does not perform a report of the periodic CSI using this PUCCH resource.

Figure 9:
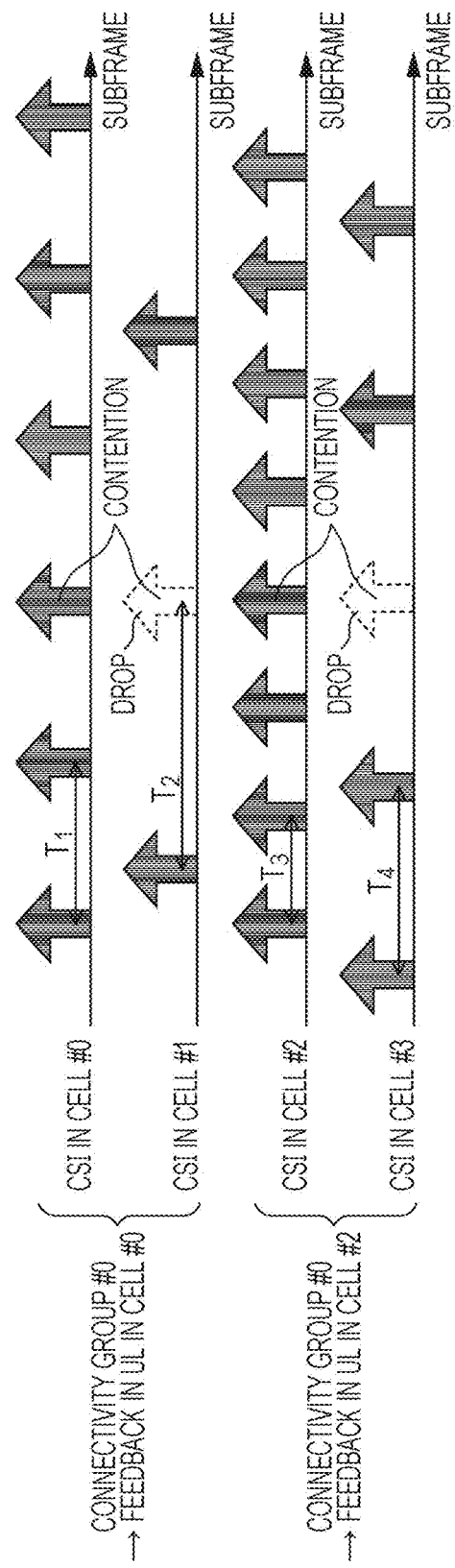
FIG. 9 is a diagram illustrating an example of a periodic CSI report according to the first embodiment.
Figure 10:
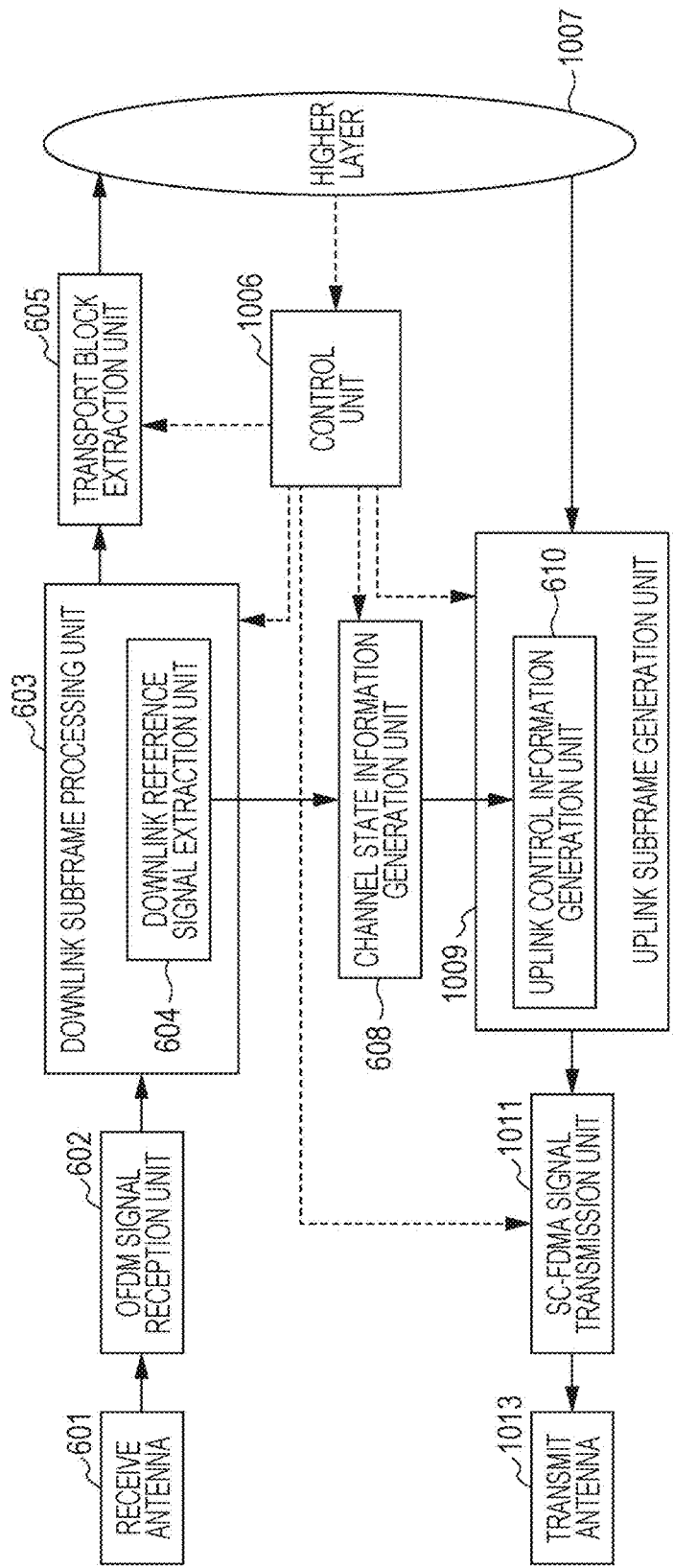
FIG. 10 is a diagram illustrating an example of a block constitution of a terminal device according to a second embodiment.
Figure 11:
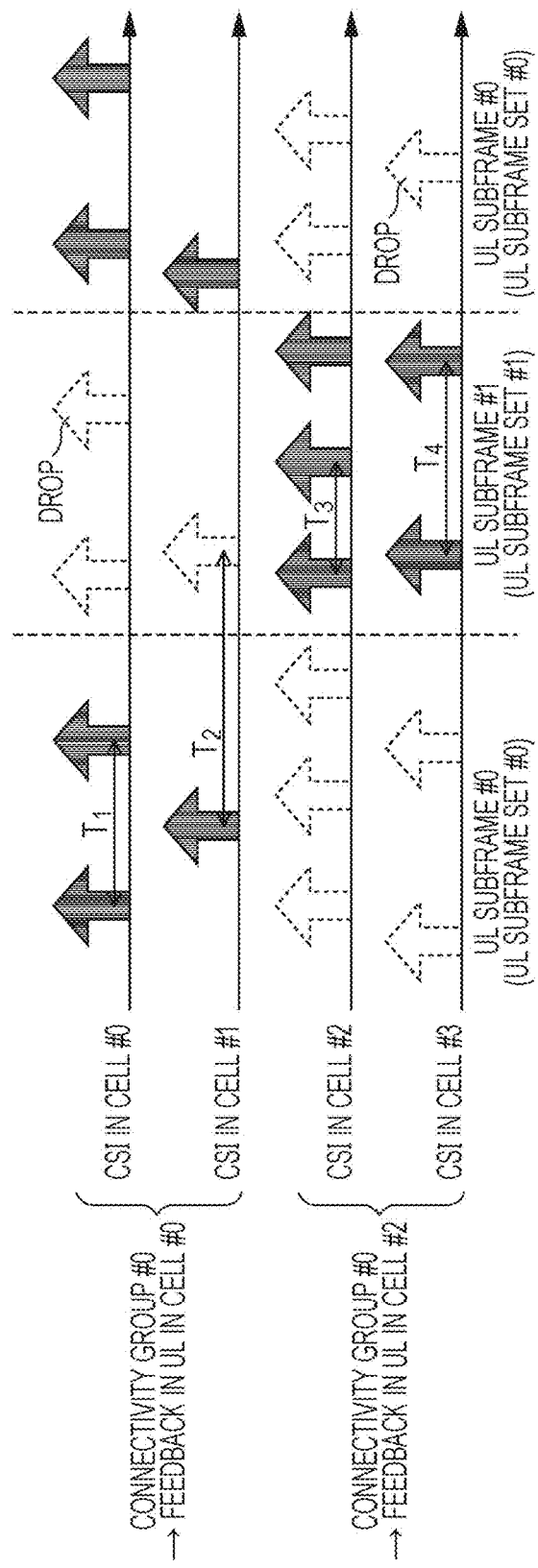
FIG. 11 is a diagram illustrating an example of a periodic CSI report according to the second embodiment.

FIG. 9 illustrates an example of the periodic CSI reporting. The periodic CSI is periodically fed back from the terminal device 1 to the base station apparatus 2 in a subframe with a periodicity that is configured with the dedicated RRC signaling. Furthermore, normally, the periodic CSI is transmitted using the PUCCH. Parameters (a periodicity of the subframe, an offset from a reference subframe to a start subframe, and a report mode) of the periodic CSI can be configured for every serving cell in a dedicated manner. An index of the PUCCH resource for the periodic CSI can be configured for every connectivity group. At this point, periodicities in cells #0, #1, #2, and #3 are assumed to be configured to be $T_1$, $T_2$, $T_3$, and $T_4$ respectively. Using the PUCCH resource of cell #0 that is not only the PS cell in the connectivity group #0, but also the primary cell, the terminal device 1 performs uplink transmission of the periodic CSI of cell #0 in a subframe with a periodicity of $T_1$ and performs the uplink transmission of the periodic CSI of cell #1 in a subframe with a periodicity of $T_2$. Using the PUCCH resource of cell #2 that is the PS cell in the connectivity group #1, the terminal device 1 performs the uplink transmission of the periodic CSI of cell #2 in a subframe with a periodicity of $T_3$ and performs the uplink transmission of the periodic CSI of cell #3 in a subframe with a periodicity of $T_4$. In a case where the periodic CSI reports are in contention between multiple servings within one connectivity group (multiple periodic CSI reports take place in one subframe), only one periodic CSI report is transmitted, and the other periodic CSI reports are dropped (are not transmitted).

Furthermore, as a method of determining which uplink resource (the PUCCH resource or the PUSCH resource) are used to the periodic CSI report and/or the HARQ-ACK, the terminal device 1 can use a method that is next described.

That is, the terminal device 1 determines the uplink resource (the PUCCH resource or the PUSCH resource) that is used to transmit the periodic CSI report and/or the HARQ-ACK, according to any one of (D1) to (D6) that will be described below, in each of the connectivity groups.

(D1) In a case where one or more serving cells are configured for the terminal device 1 and concurrent transmission of the PUSCH and the PUCCH is not configured, if in a subframe n, the uplink control information on the connectivity group includes only the periodic CSI and the PUSCH is not transmitted within the connectivity group, the uplink control information is transmitted over the PUCCH of the PS cell within this connectivity group.

(D2) In the case where one or more serving cells are configured for the terminal device 1 and concurrent transmission of the PUSCH and the PUCCH is not configured, if in the subframe n, the uplink control information on the connectivity group includes the periodic CSI and/or the HARQ-ACK and the PUSCH is transmitted in the PS cell within the connectivity group, the uplink control information is transmitted over the PUSCH of the PS cell within this connectivity group.

(D3) In the case where one or more serving cells are configured for the terminal device 1 and concurrent transmission of the PUSCH and the PUCCH is not configured, if in the subframe n, the uplink control information on the connectivity group includes the periodic CSI and/or the HARQ-ACK and the PUSCH is not transmitted in the PS cell within the connectivity group and the PUSCH is transmitted in at least one secondary cell other than the PS cell within this connectivity group, the uplink control information is transmitted over the PUSCH of the secondary cell with the lowest cell index within this connectivity group.

(D4) In a case where one or more serving cells are configured for the terminal device 1 and concurrent transmission of the PUSCH and the PUCCH is configured, if in the subframe n, the uplink control information on the connectivity group includes only the periodic CSI, the uplink control information is transmitted over the PUCCH of the PS cell within this connectivity group.

(D5) In the case where one or more serving cells are configured for the terminal device 1 and concurrent transmission of the PUSCH and the PUCCH is configured, if in the subframe n, the uplink control information on the connectivity group includes the periodic CSI and the HARQ-ACK and the PUSCH is transmitted in the PS cell within this connectivity group, the HARQ-ACK is transmitted over the PUCCH of the PS cell within this connectivity group, and the periodic CSI is transmitted over the PUSCH of the PS cell within this connectivity group.

(D6) In the case where more than one serving cell is configured for the terminal device 1 and concurrent transmission of the PUSCH and the PUCCH is configured, if in the subframe n, the uplink control information on the connectivity group includes the periodic CSI and the HARQ-ACK and the PUSCH is not transmitted in the PS cell within this connectivity group, the PUSCH is transmitted in at least another secondary cell within the same connectivity group, the HARQ-ACK is transmitted over the PUCCH of the PS cell within this connectivity group, and the periodic CSI is transmitted over the PUSCH of the secondary cell with the lowest secondary cell index within this connectivity group.

In this manner, in a communication system that has the terminal device 1 and multiple base station apparatuses 2, each of which performs communication using one or more serving cells, the terminal device 1 configures the connectivity identifier of every serving cell in the higher layer control information acquisition unit and calculates the periodic channel state information of every serving cell in a channel state information generation unit. In a case where in one subframe, the report of the periodic channel state information of the serving cell of which the connectivity identifier has the same value is in contention, pieces of periodic channel state information other than one piece of periodic channel state information are dropped and the uplink control information is generated, in the uplink control information generation unit, and the uplink subframe that includes the uplink control information is transmitted in an uplink control information transmission unit. At least any one of the base station apparatus 2-1 and the base station apparatus 2-2 configures values (for example, a first value for the serving cell of the base station apparatus 2-1, a second value for the serving cell of the base station apparatus 2-2, and the like) that correspond multiple base station apparatuses, respectively, as the connectivity identifier of every serving cell, in the higher layer control information notification unit. Furthermore, each of the base station apparatus 2-1 and the base station apparatus 2-1 receives the uplink subframe in an uplink control information reception unit. In a case where in one uplink subframe, reports of one or more pieces of the periodic channel state information of the serving cell, which take a value of the connectivity identifier that corresponds to a first base station apparatus, are in contention, each of the base station apparatus 2-1 and the base station apparatus 2-1 extracts the uplink control information that includes only one piece of periodic channel state information, among the pieces of periodic channel state information in contention, in the uplink control information extraction unit. Preferably, the CSI of the serving cell in each connectivity group is transmitted and received in the uplink subframe in the PS cell in each connectivity group.

At this point, both of, or only one of the base station apparatus 2-1 and the base station apparatus 2-2 may be equipped with a function of the higher layer control information notification unit. Moreover, in the dual connectivity, only one being equipped with this function means that the higher layer control information is transmitted from any one of the base station apparatus 2-1 and the base station apparatus 2-2 and does not mean that the base station apparatus 2-1 or the base station apparatus 2-2 is configured not to have the higher layer control information itself. In a case where the base station apparatus 2-1 and the base station apparatus 2-2 have a backhaul transmission and reception mechanism and the base station apparatus 2-2 performs a configuration (which includes a connectivity group configuration of each of these serving cells) associated with each of the serving cells that are provided by the base station apparatus 2-1, the base station apparatus 2-1 transmits information indicating this configuration to the base station apparatus 2-2 through backhaul, and, based on the information that is received through the backhaul, the base station apparatus 2-2 performs a configuration (a configuration within the base station apparatus 2-2 or signalling to the terminal device 1). Conversely, in a case where the configuration associated with the serving cell that is provided by the base station apparatus 2-2 is performed by the base station apparatus 2-1, the base station apparatus 2-2 transmits information indicating this configuration to the base station apparatus 2-1 through the backhaul, and, based on the information that is received through the backhaul, the base station apparatus 2-1 performs a configuration (a configuration within the base station apparatus 2-1 or signalling to the terminal device 1). Alternatively, the base station apparatus 2-2 may be responsible for a portion of the function of the higher layer control information notification unit, and the base station apparatus 2-1 may be responsible for the other portions of the function. In this case, the base station apparatus 2-1 can be referred to as the master base station apparatus, and the base station apparatus 2-2 can be referred to as an assistance base station apparatus. The assistance base station apparatus can provide a configuration (which includes the connectivity group configuration of each of these serving cells) associated with each of the serving cells that are provided by the assistance base station apparatus, to the terminal device 1. On the other hand, the master base station apparatus can provide a configuration (which includes the connectivity group configuration of each of these serving cells) associated with each of the serving cells that are provided by the master base station apparatus, to the terminal device 1.

The terminal device 1 can recognize that the communication with only the base station apparatus 2-1 is performed. That is, the higher layer control information acquisition unit can acquire pieces of higher layer control information that are notified by the base station apparatus 2-1 and the base station apparatus 2-2, as the high layer control information that is notified by the base station apparatus 2-1. Alternatively, the terminal device 1 can recognize that the communication with two base station apparatuses, that is, the base station apparatus 2-1 and the base station apparatus 2-1, is performed. That is, the higher layer control information acquisition unit can acquire the high layer control information that is notified by the base station apparatus 2-1 and the higher layer control information that is notified by the base station apparatus 2-2 and can combine (merge) these pieces of higher layer control information.

Accordingly, each of the base station apparatuses 2 can receive a desired periodic CSI report directly from the terminal device 1 without involving the other base station apparatuses 2 in between. For this reason, although the base station apparatuses 2 are connected to one another in the low-speed back haul, scheduling can be performed using a timely periodic CSI report.

Next, an aperiodic CSI report is described. An instruction to perform the aperiodic CSI report is provided using a CSI request field in the uplink grant that is transmitted over the PDCCH or the EPDCCH, and is transmitted using the PUSCH. More specifically, the base station apparatus 2-1 or the base station apparatus 2-2 first configures combinations (or combinations of CSI processes) of n (n is a natural number) types of serving cells for the terminal device 1 using the dedicated RRC signaling. The CSI request field can be expressed in states of n+2 types. States illustrate that each of the aperiodic CSI reports is not fed back, that the CSI report in the serving cell that is allocated with the uplink grant (or in the CSI process of the serving cell that is allocated with the uplink grant) is fed back, and that the CSI report in the combinations (or the combinations of CSI processes) of the n (n is natural number) types of serving cells that are configure in advance is fed back. The base station apparatus 2-1 or the base station apparatus 2-2 configures a value of the CSI request field based on a desired CSI report. The terminal device 1 determines which CSI report is performed, based on the value of the CSI request field, and performs the CSI report. The base station apparatus 2-1 or the base station apparatus 2-2 receives the desired CSI report.

As an example of the aperiodic CSI report at the time of the dual connectivity, the combinations (or the combinations of CSI processes) of the n (n is a natural number) types of serving cells are configured for every connectivity group. For example, the base station apparatus 2-1 or the base station apparatus 2-2 configures for the terminal device 1 the combinations (or the combinations of CSI processes within connectivity group #0) of the n (n is a natural number) types of the serving cells within the connectivity group #0, and the combinations (or the combinations of CSI processes within connectivity group #0) of the n (n is a natural number) types of serving cell within the connectivity group #1. The base station apparatus 2-1 or the base station apparatus 2-2 configures the CSI request field based on the desired CSI report. The terminal device 1 determines which connectivity group the serving cell to which the PUSCH resource that is allocated with the uplink grant which requests the aperiodic CSI report belongs to, determines which CSI report is performed, using the combinations (or the combinations of CSI processes) of the n (n is a natural number) types of serving cells that correspond to the connectivity group to which the serving cell to which the PUSCH resource is allocated with the uplink grant which requests the aperiodic CSI report belongs, and performs the aperiodic CSI report over the PUSCH that is allocated with the uplink grant which requests the aperiodic CSI report. The base station apparatus 2-1 or the base station apparatus 2-2 receives the desired CSI report.

As another example of the aperiodic CSI report at the time of the dual connectivity, one combination (or one combination of CSI processes) of the n (n is a natural number) types of serving cells is configured. Each of the combinations (or the combinations of CSI processes) of the n (n is a natural number) types of serving cells is limited to a combination of serving cells (or a combination of CSI processes of the serving cells that belong to any connectivity group) that belong to any connectivity group. The base station apparatus 2-1 or the base station apparatus 2-2 configures a value of the CSI request field based on a desired aperiodic CSI report. The terminal device 1 determines which aperiodic CSI report is performed, based on the value of the CSI request field, and performs the aperiodic CSI report. The base station apparatus 2-1 or the base station apparatus 2-2 receives the desired aperiodic CSI report.

Accordingly, each of the base station apparatuses 2 can receive the desired aperiodic CSI report directly from the terminal device 1 without involving the other base station apparatuses 2 in between. Furthermore, each PUSCH can include only the aperiodic CSI report in the serving cell (or the CSI process of the serving cell that belongs to one connectivity group) that belongs to one connectivity group, and, because of this, can receive the aperiodic CSI report that does not depend on the configuration by a different base station apparatus 2, from the terminal device 1. For this reason, although the base station apparatuses 2 are connected to one another in the low-speed back haul, the scheduling can be performed using a timely aperiodic CSI report.

Next, uplink power control by the terminal device 1 in the dual connectivity is described. At this point, the uplink power control includes power control in the uplink transmission. The uplink transmission includes transmission of the uplink signal/uplink physical channel, such as the PUSCH, the PUCCH, the PRACH, and the SRS. Moreover, as will be described below, the MeNB may collectively notify (configure) parameters relating to both of the MeNB and the SeNB. The SeNB may collectively notify (configure) the parameters relating to both of the MeNB and the SeNB. The MeNB and SeNB may notify (configure) the parameter relating to each of the MeNB and the SeNB in a dedicated manner.

FIG. 12 is a diagram illustrating an example of the subframe for the uplink transmission in the dual connectivity. In this example, a timing of the uplink transmission timing in the MCG and a timing of the uplink transmission in the MCG are different from each other. For example, a subframe i in the MCG overlaps a subframe i−1 in the SCG and a subframe i in the SCG. The subframe i in the SCG overlaps the subframe i in the MCG and a subframe i+1 in the MCG. For this reason, in the dual connectivity, when it comes to transmit power control for the uplink transmission in a certain cell group, it is desirable that transmit power for two subframes that overlap in a different cell group is considered.

The terminal device 1 may perform the uplink power control in a dedicated manner, in the MCG that includes the primary cell and the SCG that includes the primary secondary cell. Moreover, the uplink power control includes the transmit power control for the uplink transmission. The uplink power control includes the transmit power control by the terminal device 1.

For the terminal device 1, a maximum permission output power $P_{EMAX}$ of terminal device 1 is configured using dedicated signaling of the higher layer and/or common signaling (for example, a System Information Block (SIB)) of the higher layer. Moreover, this maximum permission output power may be referred to as a maximum output power of the higher layer. For example, $P_{EMAX,\ c}$ that is a maximum permission output power in a serving cell c is given by P-Max that is configured for the serving cell c. More precisely, in the serving cell c, $P_{EMAX,\ c}$ is the same value as P-Max.

For the terminal device 1, a power class $P_{PowerClass}$ of the terminal device 1 is stipulated in advance for every frequency band. The power class is a maximum output power that is stipulated without considering an allowable error that is stipulated in advance. For example, the power class is stipulated as 23 dBM. Based on the power class that is stipulated in advance, the maximum output power may be configured in a dedicated manner in the MCG and the SCG. Moreover, the power class may be stipulated independently of the MCG and the SCG.

A configuration maximum output power is configured for the terminal device 1 for every serving cell. The configuration maximum output power $P_{CMAX,\ c}$ is configured for the terminal device 1 for the serving cell c. $P_{CMAX}$ is a sum of $P_{CMAX,\ c}$'s. Moreover, the configuration maximum output power may be referred to as a maximum output power of the physical layer.

$P_{CMAX,\ c}$ is a value that is equal to or greater than $P_{CMAX\_L,\ c}$ and is equal to or smaller than $P_{CMAX\_H,\ c}$. For example, the terminal device 1 sets $P_{CMAX,\ c}$ within this range. $P_{CMAX\_H,\ c}$ is the smallest of values, that is, $P_{EMAX,\ c}$ and $P_{PowerClass}$. $P_{CMAX\_L,\ c}$ is the smallest of a value that is based on $P_{EMAX,\ c}$ and a value that is based on $P_{PowerClass}$. A value that is based on $P_{PowerClass}$ is a value that results from subtracting from $P_{PowerClass}$ a value that is based on a maximum power reduction (MPR). The MPR is a maximum power reduction for the maximum output power, and is determined based on configuration of a modulation scheme and a transmission bandwidth for the uplink channel and/or the uplink signal that is to be transmitted. In each of the subframes, the MPR is evaluated for every slot, and is given by a maximum value that is obtained over transmission within this slot. A maximum MPR in two slots within the subframe is applied for this entire subframe. That is, because in some cases, the MPR differs from one subframe to another, there is a likelihood that $P_{CMAX\_L,\ c}$ will differ from one subframe to another as well. As a result, there is a likelihood that $P_{CMAX,\ c}$ will differ from one subframe to another as well.

The terminal device 1 can configure or determine $P_{CMAX}$ for each of the MeNB (MCG) and the SeNB (SCG). That is, a sum of power allocations can be configured or determined for every cell group. A sum of configuration maximum output powers for the MeNB is defined as $P_{CMAX,\ MeNB}$, and the sum of power allocations for the MeNB is defined as $P_{alloc\_MeNB}$. The sum of configuration maximum output powers for the SeNB is defined as $P_{CMAX,\ SeNB}$ and the sum of power allocations for the SeNB is defined as $P_{alloc\_SeNB}$. $P_{CMAX,\ MeNB}$ and $P_{alloc\_MeNB}$ can be the same value. $P_{CMAX,\ SeNB}$ and $P_{alloc\_SeNB}$ can be the same value. That is, the terminal device 1 performs the transmit power control in such a manner that a sum of output powers (allocation powers) of the cell associated with the MeNB is equal to or smaller than $P_{CMAX,\ MeNB}$ or $P_{alloc\_MeNB}$ and the sum of output powers (allocation powers) of the cell associated with the SeNB is equal to or smaller than $P_{CMAX,\ SeNB}$ or $P_{alloc\_SeNB}$. Specifically, the terminal device 1 performs scheduling on the transmit power for the uplink transmission for every cell group in such a manner that a value which is configured for every cell group is not exceeded. At this point, the scheduling is to perform transmission stopping of or the transmit power reduction for the uplink transmission that has a low priority level, based on priority levels of the uplink transmissions that are performed at the same time in each cell group and on the configuration maximum output power for this cell group. Moreover, in a case where the transmit power control is performed on each of the uplink transmissions in a dedicated manner, the method that is described according to the present embodiment can apply to each of the uplink transmissions in a dedicated manner.

$P_{CMAX,\ MeNB}$ and/or $P_{CMAX,\ SeNB}$ is configured based on a minimum guaranteed power that is configured through higher layer signaling. The minimum guaranteed power will be described in detail below.

The minimum guaranteed power is configured for every cell group in a dedicated manner. In a case where the minimum guaranteed power is not configured with the higher layer signaling, the terminal device 1 can assume the minimum guaranteed power to be a value (for example, 0) that is stipulated in advance. The configuration maximum output power for the MeNB is defined as $P_{MeNB}$. The configuration maximum output power for the SeNB is defined as $P_{SeNB}$. For example, $P_{MeNB}$ and $P_{SeNB}$ may be used as a minimum power that is guaranteed for retaining minimum communication quality, for the uplink transmission for the MeNB and the SeNB. The minimum guaranteed power is also referred to as a guaranteed power, a retention power, or a demanded power.

Moreover, in a case where a sum of the transmit power for the uplink transmission for the MeNB and the transmit power for the uplink transmission for the SeNB exceeds $P_{CMAX}$, the guaranteed power may be used for transmission of a channel or a signal that has a high priority level, or for retention of transmission quality of this channel or this signal, based on priority ranking and the like that are stipulated in advance. Moreover, $P_{MeNb}$ and $P_{SeNB}$ can be used as a minimum indispensable power (more precisely, a guaranteed power) that is used for communication and, when calculating power allocation in each of the CGs, can be used as a power value that is reserved for a CG other than a calculation target CG.

$P_{MeNB}$ and $P_{SeNB}$ can be stipulated an absolute power value (which, for example, is expressed in a dBm unit). In the case of the absolute power value, $P_{MeNB}$ and $P_{SeNB}$ are configured. A value of a sum of $P_{MeNB}$ and $P_{SeNB}$ is preferably equal to or smaller than $P_{CMAX}$, but is not limited to this. In a case where the value of the sum of $P_{MeNB}$ and $P_{SeNB}$ is greater than $P_{CMAX}$, processing that reduces a total power to $P_{CMAX}$ or less by performing scheduling is further indispensable. For example, this scheduling is to multiply a total power value of the MCG and a total power value of the SCG by one efficiency that is a value which is smaller than 1.

$P_{MeNB}$ and $P_{SeNB}$ may be stipulated as a ratio (a rate or an absolute value) that is with respect to $P_{CMAX}$. For example, $P_{MeNB}$ and $P_{SeNB}$ may be expressed in a dB unit with respect to a decibel value of $P_{CMAX}$, and may be expressed as a ratio that is with respect to a true value of $P_{CMAX}$. A ratio relating to $P_{MeNB}$ and a ratio relating to $P_{SeNB}$ are configured, and based on these ratios, $P_{MeNB}$ and $P_{SeNB}$ are determined. In the case of the ratio expression, it is preferable that a value of a sum of the ratio relating to the $P_{MeNB}$ and the ratio relating to $P_{SeNB}$ is equal to or smaller than 100%.

What is described above, in other words, is as follows. $P_{MeNB}$ and/or $P_{SeNB}$ can be configured in a shared manner or independently as a parameter for the uplink transmission, through the higher layer signaling. In a cell that belongs to the MeNB, $P_{MeNB}$ indicates a minimum endorsement power with respect to the sum of transmit powers that are allocated to each of or all of the uplink transmissions. In a cell that belongs to the SeNB, $P_{SeNB}$ indicates a minimum endorsement power with respect to the sum of transmit powers that are allocated to each of or all of the uplink transmissions. Each of $P_{MeNB}$ and $P_{SeNB}$ is a value that is equal to or greater than 0. The sum of $P_{MeNB}$ and $P_{SeNB}$ may be configured in such a manner as not to exceed $P_{CMAX}$ or a prescribed maximum transmit power. As will be described below, the minimum endorsement power is also referred to as an endorsement power or a guaranteed power.

Moreover, the guaranteed power may be configured for every serving cell. Furthermore, the guaranteed power may be configured for every cell group. Furthermore, the guaranteed power may be configured for every base station apparatus (the MeNB and the SeNB). Furthermore, the guaranteed power may be configured for every uplink signal. Furthermore, the guaranteed power may be configured for a higher layer parameter. Furthermore, only $P_{MeNB}$ may be configured with the RRC message, and $P_{SeNB}$ may not be configured with the RRC message. At this time, a value (a remaining power) that is obtained by subtracting configured $P_{MeNB}$ from $P_{CMAX}$ may be set as $P_{SeNB}$.

The guaranteed power may be set for every subframe regardless of the presence or absence of the uplink transmission. Furthermore, the guaranteed power may not be applied in the subframe (for example, a downlink subframe in a TDD UL-DL configuration) in which the uplink transmission is not expected (in which, the terminal device recognizes, the uplink transmission is not performed). That is, after a transmit power for a certain CG is determined, a guaranteed power for another CG may not be reserved. Furthermore, the guaranteed power may be applied in a subframe in which periodic uplink transmission (for example, RACH transmission or the like using P-CSI, a trigger type 0 SRS, TTI bundling, SPS, and the higher layer signaling) takes place. Information indicating whether the guaranteed power is enabled or disabled in all subframes may be notified through the higher layer.

A subframe set to which the guaranteed power is applied may be notified as the higher layer parameter. Moreover, the subframe set to which the guaranteed power is applied may be configured for every serving cell. Furthermore, the subframe set to which the guaranteed power is applied may be configured for every cell group. Furthermore, the subframe set to which the guaranteed power is applied may be configured for every uplink signal. Furthermore, the subframe set to which the guaranteed power is applied may be configured for every base station apparatus (the MeNB and SeNB). Furthermore, the subframe set to which the guaranteed power is applied may be common to the base station apparatuses (the MeNB and SeNB). At that time, the MeNB and the SeNB may be synchronized. Furthermore, in a case where the MeNB and the SeNB are asynchronous, the subframe set to which the guaranteed power is applied may be set in a dedicated manner.

In a case where the guaranteed power is configured for each of the MeNB (the MCG and the serving cell that belongs to the MCG) and the SeNB (the SCG and the serving cell that belongs to the SCG), it may be determined at all times whether or not the guaranteed power is set in all the subframes, based on a frame structure type that is set for the MeNB (the MCG and the serving cell that belongs to the MCG) and the SeNB (the SCG and the serving cell that belongs to the SCG). For example, in a case where the MeNB and the SeNB are different from each other in the frame structure type, the guaranteed power may be set in all the subframes. At that time, the MeNB and the SeNB may not be asynchronous. In a case where the MeNB and the SeNB (the subframes and radio frames of the MeNB and the SeNB) are synchronous, the guaranteed power may not be considered in an FDD uplink subframe (an uplink cell subframe) that overlaps the downlink subframe in the TDD UL-DL configuration. More precisely, at that time, a maximum value of an uplink power for the uplink transmission in the FDD uplink subframe may be $P_{UE\_MAX}$ or $P_{UE\_MAX, c}$.

A method of configuring (a method of determining) $P_{alloc, MeNB}$ and/or $P_{alloc, SeNB}$ will be described in detail below.

An example of a determination of $P_{alloc, MeNB}$ and/or $P_{alloc, SeNB}$ is a determination that is made in the following steps. In a first step, in the MCG and the SCG, $P_{pre\_MeNB}$ and $P_{pre\_SeNB}$ each are obtained. In each of the cell groups, $P_{pre\_MeNB}$ and $P_{pre\_SeNB}$ are given by the smallest of values, that is, a sum of powers that are requested for actual uplink transmission, and the guaranteed power (that is, $P_{MeNB}$ and $P_{SeNB}$) that is configured for each of the cell groups. In a second step, a residual power is allocated (added) to $P_{pre\_MeNB}$ and/or $P_{pre\_SeNB}$, based on a prescribed method. A residual power is a power that results from subtracting $P_{pre\_MeNB}$ and $P_{pre\_SeNB}$ from $P_{CMAX}$. A portion or all portions of the residual power can be used. The powers that are determined based on these steps are used as $P_{alloc, MeNB}$ and $P_{alloc, SeNB}$.

An example of the power that is requested for the actual uplink transmission is a power that is determined based on allocation of the actual uplink transmission and the transmit power control for this uplink transmission. For example, in a case where the uplink transmission is for the PUSCH, the power for this is determined based on the number of RBs to which at least the PUSCH is allocated, estimation of a downlink path loss that is calculated in the terminal device 1, a value that is referred to for a transmit power control command, and a parameter that is configured with the higher layer signaling. In the case where the uplink transmission is for the PUCCH, the power for this is determined based on a value that depends on at least a PUCCH format, the value that is referred to for the transmit power control command, and the estimation of the downlink path loss that is calculated in the terminal device 1. In a case where the uplink transmission is for the SRS, the power for this is determined based on the number of RBs for transmitting at least the SRS, and a state that is adjusted for the power control for the PUSCH.

An example of the power that is requested for the actual uplink transmission is the smallest of values, that is, the power that is determined based on the allocation of the actual uplink transmission and the transmit power control for this uplink transmission, and the configuration maximum output power (that is, $P_{CMAX, c}$) in the cell to which this uplink transmission is allocated. Specifically, a request power (a power that is requested for the actual uplink transmission) in a certain cell group is given by $\Sigma(\min(P_{CMAX, j}, P_{PUCCH}+P_{PUSCH, j}))$. However, j indicates a serving cell associated with this cell group. In a case where this serving cell is a PCell or a pSCell and there is no PUSCH transmission in this serving cell, $P_{PUCCH}$ is assumed to be 0. In a case where this serving cell is an SCell, (more precisely, in a case where this serving cell is neither a PCell nor a pSCell), $P_{PUCCH}$ is assumed to be 0. In a case where there is no PUSCH transmission in this serving cell, $P_{PUSCH, j}$ is assumed to be 0. Moreover, as a method of calculating the request power, a method can be used that is described referring to steps (t1) to (t9) that will be described below.

An example of the determination of $P_{alloc, MeNB}$ and/or $P_{alloc, SeNB}$ is a determination that is made in the following steps. In the first step, in the MCG and the SCG, $P_{pre\_MeNB}$ and $P_{pre\_SeNB}$ each are obtained. In each of the cell groups, $P_{pre\_MeNB}$ and $P_{pre\_SeNB}$ are given by the guaranteed power (that is, $P_{MeNB}$ and $P_{SeNB}$) that is configured for each of the cell groups. In the second step, the residual power is allocated (added) to $P_{pre\_MeNB}$ and/or $P_{pre\_SeNB}$, based on a prescribed method. For example, a priority level of the cell group that is previously transmitted is regarded as being high, and thus the residual power is allocated. For example, the residual power is allocated to the cell group that is previously transmitted without considering the cell group that has the likelihood of being transmitted later. The residual power is a power that results from subtracting $P_{pre\_MeNB}$ and $P_{pre\_SeNB}$ from $P_{CMAX}$. A portion or all portions of the residual power can be used. The powers that are determined based on these steps are used as $P_{alloc, MeNB}$ and $P_{alloc, SeNB}$.

The residual power can be allocated for the uplink channel and/or the uplink signal that does not satisfy $P_{MeNB}$ or $P_{SeNB}$. The allocation of the residual power is performed based on priority levels of types of uplink transmissions. The types of uplink transmissions are a types of uplink channels, uplink signals and/or UCIs. The priority levels are given across the cell groups. The priority levels may be prescribed in advance, and may be configured with the higher layer signaling.

An example of a case where the priority level is stipulated in advance is a case where the priority level is based on the cell group and the uplink channel. For example, it is stipulated that the priority level of the type of uplink transmission decreases in this sequence: the PUCCH in the MCG, the PUCCH in the SCG, the PUSCH that includes the UCI in the MCG, the PUSCH that includes the UCI in the SCG, the PUSCH that does not include the UCI in the MCG, the PUSCH that does not include the UCI in the SCG.

An example of a case where the priority level is stipulated in advance is a case where the priority level is based on the cell group, and the type of uplink channel and/or UCI. For example, it is stipulated that the priority level of the type of uplink transmission decreases in this sequence: the PUCCH or the PUSCH that includes the UCI which includes at least the HARQ-ACK and/or the SR in the MCG, the PUCCH or the PUSCH that includes the UCI which includes at least the HARQ-ACK and/or SR in the SCG, the PUCCH or the PUSCH that includes the UCI which includes only the CSI in the MCG, the PUCCH or the PUSCH that includes the UCI which includes only the CSI in the SCG, the PUSCH that does not include the UCI in the MCG, the PUSCH that does not include the UCI in the SCG.

In an example of a case where the priority level is configured with the higher layer signaling, the priority level is configured for the cell group, and the type of uplink channel and/or UCI. For example, the priority level of the type of uplink transmission is configured for each of the PUCCH in the MCG, the PUCCH in the SCG, the PUSCH that includes the UCI in the MCG, the PUSCH that includes the UCI in the SCG, the PUSCH that does not include the UCI in the MCG, and the PUSCH that does not include the UCI in the SCG.

In an example of allocation of the residual power that is based on the priority level. The residual power is allocated to the cell group that includes a type of uplink transmission that has the highest priority level in each of the cell groups. Moreover, the power that is left after the allocation to the cell group that includes the type of uplink transmission which has the highest priority level is allocated to another cell group. Specific operation of the terminal device 1 is as follows.

In an example of the allocation of the residual power that is based on the priority level, the residual power is allocated to the cell group that has the largest sum of parameters (points) which are based on the priority level.

In the example of the allocation of the residual power that is based on the priority level, the residual power is allocated to each of the cell groups according to a ratio that is determined based on a sum of parameters (points) that are based on the priority level. For example, when the sums of parameters (points) that are based on the priority level in the MCG and the SCG, respectively, are 15 and 5, 75% of the residual power is allocated to the MCG, and the 25% of the residual power is allocated to the SCG. The parameters that are based on the priority level may be further determined based on the number of resource blocks that are allocated to the uplink transmission.

In the example of the allocation of the residual power that is based on the priority level, the residual power is allocated in order of decreasing the priority level of the type of uplink transmission. According to the priority levels of the types of uplink transmissions, this allocation is performed across the cell groups. Specifically, the residual power is allocated in such a manner as to satisfy the request power for the type uplink transmission, in order of deceasing the priority level of the type of uplink transmission. Additionally, this allocation is performed on the presumption that in each of the cell groups, $P_{pre\_MeNB}$ and $P_{pre\_SeNB}$ are allocated to the type of uplink transmission which has a high priority level. Based on this presumption, the residual power is allocated to the type of uplink transmission that does not satisfy the request power, and then is allocated to the type of uplink transmission that has a high priority level.

In the example of the allocation of the residual power that is based on the priority level, the residual power is allocated in order of decreasing the priority level of the type of uplink transmission. According to the priority levels of the types of uplink transmissions, this allocation is performed across the cell groups. Specifically, the residual power is allocated in such a manner as to satisfy the request power for the type uplink transmission, in order of deceasing the priority level of the type of uplink transmission. Additionally, this allocation is performed on the presumption that in each of the cell groups, $P_{pre\_MeNB}$ and $P_{pre\_SeNB}$ are allocated to the type of uplink transmission which has a low priority level. Based on this presumption, the residual power is allocated to the type of uplink transmission that does not satisfy the request power, and then is allocated to the type of uplink transmission that has a high priority level.

Another example of the allocation of the residual power that is based on the priority level is as follows. The terminal device that communicates with the base station apparatus using a first cell group and a second cell group includes a transmission unit that transmits a channel and/or a signal based on a maximum output power in the first cell group in a certain subframe. In a case where information relating to the uplink transmission in the second cell group is recognized, the residual power is allocated based on the priority level of the type of uplink transmission. The residual power is given by subtracting the power that is determined based on the uplink transmission in the first cell group and the power that is determined based on the uplink transmission in the second cell group from a sum of the maximum output powers of the terminal device. The maximum output power is a sum of the power that is determined based on the uplink transmission in the first cell group and the power that is allocated to the first cell group, of the residual power.

Furthermore, the residual power is allocated to cell groups, starting from the cell group in which the type of uplink transmission which is a high priority level is performed.

Furthermore, the residual power is allocated on the following presumption. The power that is determined based on the uplink transmission in the first cell group is allocated to the type of uplink transmission that has a high priority level within the first cell group. The power that is determined based on the uplink transmission in the second cell group is allocated to the type of uplink transmission that has a high priority level within the second cell group.

Furthermore, the residual power is allocated on the following presumption. The power that is determined based on the uplink transmission in the first cell group is allocated to the type of uplink transmission that has a low priority level within the first cell group. The power that is determined based on the uplink transmission in the second cell group is allocated to the type of uplink transmission that has a low priority level within the second cell group.

Furthermore, the residual power is allocated based on the sum of parameters that are determined based on the priority level of the type of uplink transmission in each of the cell groups.

An example of a specific method of allocating the guaranteed power and the residual power (the remaining power) among cell groups (CGs) is as follows. When it comes to the power allocation among the CGs, the allocation of the guaranteed power is performed in the first step, and the allocation of the remaining power is performed in the second step. The powers that are allocated in the first step are $P_{pre\_MeNB}$ and $P_{pre\_SeNB}$. Sums of the power that is allocated in the first step and the power that is allocated in the second step are $P_{alloc\_MeNB}$ and $P_{alloc\_SeNB}$. Moreover, the guaranteed power is also referred to as a first reservation power, the power that is allocated in the first step, or a first allocation power. The remaining power is also referred to as a second reservation power, the power that is allocated in the second step, or a second allocation power.

An example of the allocation of the guaranteed power follows the following rules.

(G1) For a certain CG (a first CG) (when determining the power that is allocated to a certain CG (the first CG)), if the terminal device recognizes the uplink transmission in a different CG (a second CG) is not performed in a subframe that overlaps a subframe in this CG (the first CG) (recognizes that there is no overlapping), at that time, the terminal device does not reserve (does not allocate) the guaranteed power for the allocation power in the different CG (the second CG). More precisely, a maximum transmit power in the CG1 is $P_{CMAX}$.

(G2) In other cases, the terminal device reserves (allocates) the guaranteed power for the allocation power in the different CG (the second CG).

An example of the allocation of the remaining power follows the following rules.

(R1) For a certain CG (the first CG) (when determining the power that is allocated to a certain CG (the first CG)), if the terminal device recognizes that the uplink transmission that has a higher priority level than the uplink transmission in the CG (the first CG) is performed in the different CG (the second CG), in the subframe that overlaps the subframe in the CG (the first CG), at that time, the terminal device reserves the remaining power for the allocation power in the different CG (the second CG).

(R2) In other cases, the terminal device allocates the remaining power to the CG (the first CG) and does not reserve the remaining power for the allocation power in the different CG (the second CG).

An example of the allocation of the guaranteed power follows the following rules.

(G1) For a certain CG (the first CG) (when determining the power that is allocated to a certain CG (the first CG)), if the terminal device does not recognize information relating to the uplink transmission in the different CG (the second CG), in the subframe that overlaps the subframe in the CG (the first CG), the terminal device performs the following operations. Based on the information relating to the uplink transmission in the CG (the first CG), the terminal device allocates the power ($P_{pre\_MeNB}$ or $P_{pre\_SeNB}$) that is requested for the allocation power in the CG (the first CG). The terminal device allocates the guaranteed power ($P_{MeNB}$ or $P_{SeNB}$) for the allocation power in the different CG (the second CG).

(G2) In other cases, the terminal device performs the following operations. Based on the information relating to the uplink transmission in the CG (the first CG), the terminal device allocates the power ($P_{pre\_MeNB}$ or $P_{pre\_SeNB}$) that is requested for the allocation power in the CG (the first CG). Based on the information relating to the uplink transmission in the different CG (the second CG), the terminal device allocates the power ($P_{pre\_MeNB}$ or $P_{pre\_SeNB}$) that is requested for the allocation power in the different CG (the second CG).

An example of the allocation of the remaining power follows the following rules.

(R1) For a certain CG (the first CG) (when determining the power that is allocated to a certain CG (the first CG)), if the terminal device does not recognize information relating to the uplink transmission in the different CG (the second CG), in the subframe that overlaps the subframe in the CG (the first CG), the terminal device performs the following operations. The terminal device allocates the remaining power to the allocation power in the CG (the first CG).

(R2) In other cases, the terminal device allocates the remaining power to the allocation power in the CG (the first CG) and the allocation power in the different CG (the second CG), based on a prescribed method. As a specific method, the method that is described according to the present embodiment can be used.

An example of a definition (a calculation method) of the residual power is as follows. This example is a case where the terminal device 1 recognizes that the allocation of the uplink transmission to the subframe that overlaps in a different cell group.

In the subframe i that is illustrated in FIG. 12, the residual power that is calculated in a case where the allocation power ($P_{alloc\_MeNB}$) for the MCG is computed is given by subtracting from $P_{CMAX}$ the power ($P_{pre\_MeNB}$) that is allocated in the first step in the subframe i in the MCG and the power relating to the subframe in the SCG that overlaps the subframe i in the MCG. In FIG. 12, the overlapping subframes in the SCG are the subframe i−1 and the subframe i in the SCG. The power relating to the subframe in the SCG is the largest of values, that is, the transmit power for the actual uplink transmission in the subframe i−1 in the SCG, and the power ($P_{pre\_SeNB}$) that is allocated in the first step in the subframe i in the SCG.

In the subframe i that is illustrated in FIG. 12, the residual power that is calculated in a case where the allocation power ($P_{alloc\_SeNB}$) for the SCG is computed is given by subtracting from $P_{CMAX}$ the power $P_{pre\_SeNB}$) that is allocated in the first step in the subframe i in the SCG and the power relating to the subframe in the MCG that overlaps the subframe i in the SCG. In FIG. 12, the overlapping subframes in the MCG are the subframe i and the subframe i+1 in the MCG. The power relating to the subframe in the MCG is the largest of values, that is, the transmit power for the actual uplink transmission in the subframe i in the MCG, and the power ($P_{pre\_MeNB}$) that is allocated in the first step in the subframe i+1 in the MCG.

Another example of the definition (the calculation method) of the residual power is as follows. This example is a case where the terminal device 1 does not recognize the allocation of the uplink transmission to the subframe that overlaps in a different cell group.

In the subframe i that is illustrated in FIG. 12, the residual power that is calculated in a case where the allocation power ($P_{alloc\_MeNB}$) for the MCG is computed is given by subtracting from $P_{CMAX}$ the power ($P_{pre\_MeNB}$) that is allocated in the first step in the subframe i in the MCG and the power relating to the subframe in the SCG that overlaps the subframe i in the MCG. In FIG. 12, the overlapping subframes in the SCG are the subframe i−1 and the subframe i in the SCG. The power relating to the subframe in the SCG is the largest of values, that is, the transmit power for the actual uplink transmission in the subframe i−1 in the SCG, and the guaranteed power (PSeNB) in the subframe i in the SCG.

In the subframe i that is illustrated in FIG. 12, the residual power that is calculated in a case where the allocation power ($P_{alloc\_SeNB}$) for the SCG is computed is given by subtracting from $P_{CMAX}$ the power ($P_{pre\_SeNB}$) that is allocated in the first step in the subframe i in the SCG and the power relating to the subframe in the MCG that overlaps the subframe i in the SCG. In FIG. 12, the overlapping subframes in the MCG are the subframe i and the subframe i+1 in the MCG. The power relating to the subframe in the MCG is the largest of values, that is, the transmit power for the actual uplink transmission in the subframe i in the MCG, and the guaranteed power ($P_{MeNB}$) in the subframe i+1 in the MCG.

Another example of the definition (the calculation method) of the residual power is as follows. The terminal device that communicates with the base station apparatus using the first cell group and the second cell group includes the transmission unit that transmits a channel and/or a signal based on the maximum output power in the first cell group in a certain subframe. In a case where information relating to the uplink transmission in the second cell group in a rear subframe that overlaps the certain subframe is recognized, the maximum output power in the first cell group is a sum of the power that is determined based on the uplink transmission in the first cell group in the certain subframe and the power that is allocated to the first cell group, of the residual power. The residual power is given by subtracting the power that is determined based on the uplink transmission in the first cell group in the certain subframe and the power for the second cell group from the sum of the maximum output powers of the terminal device. The power for the second cell group is the largest of values, that is, an output power in the second cell group in a front subframe that overlaps the certain subframe, and a power that is determined based on the uplink transmission in the second cell group in the rear subframe that overlaps the certain subframe.

Another example of the definition (the calculation method) of the residual power is as follows. The terminal device that communicates with the base station apparatus using the first cell group and the second cell group includes the transmission unit that transmits a channel and/or a signal based on the maximum output power in the first cell group in a certain subframe. In a case where the information relating to the uplink transmission in the second cell group in the rear subframe that overlaps the certain subframe is not recognized, the maximum output power in the first cell group is the sum of the power that is determined based on the uplink transmission in the first cell group in the certain subframe and the power that is allocated to the first cell group, of the residual power. The residual power is given by subtracting the power that is determined based on the uplink transmission in the first cell group in the certain subframe and the power for the second cell group from the sum of the maximum output powers of the terminal device. The power for the second cell group is the largest of values, that is, the output power in the second cell group in the front subframe that overlaps the certain subframe, and a guaranteed power in the second cell group in the rear subframe that overlaps the certain sub frame.

Another example of the definition (the calculation method) of the residual power is as follows. The terminal device that communicates with the base station apparatus using the first cell group and the second cell group includes the transmission unit that transmits a channel and/or a signal based on the maximum output power in the first cell group in a certain subframe. In the case where the information relating to the uplink transmission in the second cell group in the rear subframe that overlaps the certain subframe is not recognized, the maximum output power in the first cell group is given by subtracting the power for the second cell group from the sum of the maximum output powers of the terminal device. The power for the second cell group is the largest of values, that is, the output power in the second cell group in the front subframe that overlaps the certain subframe, and a guaranteed power in the second cell group in the rear subframe that overlaps the certain subframe.

Another method of allocating the guaranteed power and the remaining power will be described below. As will be described below, $P_{MCG}$ is calculated by an arithmetic operation that uses at least $P_{CMAX}$ and $P_{SeNB}$, and $P_{SCG}$ is calculated by an arithmetic operation that uses at least $P_{CMAX}$ and $P_{MeNB}$.

First, as a step (s1), a power value of the MCG and a power value of the SCG are initialized and the residual power (an unallocated residual power) is calculated. Furthermore, a residual guaranteed power (the unallocated guaranteed power) is initialized. More specifically, it is assumed that $P_{MCG}=0$, $P_{SCG}=0$, and $P_{Remaining}=P_{CMAX}-P_{MeNB}-P_{SeNB}$. Furthermore, it is assumed that $P_{MeNB, Remaining}=P_{MeNB}$ and $P_{SeNB, Remaining}=P_{SeNB}$. At this point, $P_{MCG}$ and $P_{SCG}$ are the power value of the MCG and the power value of the SCG, respectively, and $P_{Remaining}$ is a residual power value. $P_{CMAX}$, $P_{MeNB}$, and $P_{SeNB}$ are the parameters described above. Furthermore, $P_{MeNB, Remaining}$ and $P_{SeNB, Remaining}$ are a value of a residual guaranteed power of the MCG and a value of a residual guaranteed power of the SCG, respectively. Moreover, at this point, each power value is linear.

Next, the residual power and the residual guaranteed power are sequentially allocated to each CG, in this sequence: the PUCCH in the MCG, the PUCCH in the SCG, the PUSCH that includes the UCI in the MCG, the PUSCH that does not include the UCI in the MCG, the PUSCH that does not include the UCI in the SCG. At this time, in a case where the residual guaranteed power is present, the residual guaranteed power is previously allocated and after the residual guaranteed power is absent, the residual guaranteed power is allocated. Furthermore, an amount of power that is sequentially allocated to each CG is basically a power value (a power value that is based on a Transmit Power Control (TPC) command, a resource assignment, or the like) that is requested for each channel. However, in a case where the residual power or the residual guaranteed power does not satisfy the power value that is requested, the entire residual power or the entire residual guaranteed power is allocated. When the power is allocated to the CG, as much residual or residual guaranteed power as the allocated power is reduced. Moreover, the allocation of the residual power or the residual guaranteed power that has a value of 0 means that the residual power or the residual guaranteed power is not allocated. As more specific steps of calculating the power value of every CG, (s2) to (s8) will be described below.

As a step (s2), the following arithmetic operation is performed. If there is the PUCCH transmission in the MCG (or if the terminal device 1 recognizes that there is the PUCCH transmission in the MCG), the arithmetic operations, that is, $P_{MCG}=P_{MCG}+\delta_1+\delta_2$, $P_{MeNB, Remaining}=P_{MeNB, Remaining}-\delta_1$, and $P_{Remaining}=P_{Remaining}-\delta_2$, are performed. At this point, $\delta_1=\min(P_{PUCCH, MCG}, P_{MeNB, Remaining})$, and $\delta_2=\min(P_{PUCCH, MCG}-\delta_1, P_{Remaining})$. That is, a power value that is requested for the PUCCH transmission is allocated from the residual guaranteed power in the MCG to the MCG. At this time, in a case where the residual guaranteed power in the MCG falls short of the power that is requested for the PUCCH transmission, the entire residual guaranteed power is allocated to the MCG and then as much power as a power shortage is allocated from the residual power to the MCG. At this point, additionally, in a case where the residual power insufficiently falls short, the entire residual power is allocated to the MCG. A value of as much power as is allocated from the residual guaranteed power or the residual power is added to the power value of the MCG. The value of as much power as is allocated to the MCG is subtracted from the residual guaranteed power or the residual power. Moreover, $P_{PUCCH, MCG}$ is a power value that is requested for the PUCCH transmission in the MCG, and is calculated based on a parameter that is configured by the higher layer, a downlink path loss, an adjustment value that is determined by the UCI which is transmitted over the PUCCH, an adjustment value that is determined by the PUCCH format, an adjustment value that is determined by the number of antenna ports which are used for the PUCCH transmission, a value that is based on a TPC command, or the like.

As a step (s3), the following arithmetic operation is performed. If there is the PUCCH transmission in the SCG (or if the terminal device 1 recognizes that there is the PUCCH transmission in the SCG), the arithmetic operations, that is, $P_{SCG}=P_{SCG}+\delta_1+\delta_2$, $P_{SeNB, Remaining}=P_{SeNB, Remaining}-\delta_1$, and $P_{Remaining}=P_{Remaining}-\delta_2$, are performed. At this point, $\delta_1=\min(P_{PUCCH, SCG}, P_{SeNB, Remaining})$, and $\delta_2=\min(P_{PUCCH, SCG}-\delta_1, P_{Remaining})$. That is, a power value that is requested for the PUCCH transmission is allocated from the residual guaranteed power in the SCG to the SCG. At this time, in a case where the residual guaranteed power in the SCG falls short of the power that is requested for the PUCCH transmission, the entire residual guaranteed power is allocated to the SCG, and as much power as a power shortage is allocated from the residual power to the SCG. At this point, additionally, in the case where the residual power insufficiently falls short, the entire residual power is allocated to the SCG. The value of as much power as is allocated from the residual guaranteed power or the residual power is added to the power value of the SCG. The value of as much power as is allocated to the SCG is subtracted from the residual guaranteed power or the residual power. Moreover, $P_{PUCCH, SCG}$ is a power value that is requested for the PUCCH transmission in the SCG, and is calculated based on the parameter that is configured by the higher layer, the downlink path loss, the adjustment value that is determined by the UCI which is transmitted over the PUCCH, the adjustment value that is determined by the PUCCH format, the adjustment value that is determined by the number of antenna ports which are used for the PUCCH transmission, the value that is based on the TPC command, or the like.

As a step (s4), the following arithmetic operation is performed. If there is the PUSCH transmission that includes the UCI in the MCG (or if the terminal device 1 recognizes that there is the PUSCH transmission which includes the UCI in the MCG), the arithmetic operations, that is, $P_{MCG}=P_{MCG}+\delta_1+\delta_2$, $P_{MeNB, Remaining}=P_{MeNB, Remaining}-\delta_1$, and $P_{Remaining}=P_{Remaining}-\delta_2$, are performed. At this point, $\delta_1=\min(P_{PUSCH, j, MCG}, P_{MeNB, Remaining})$, and $\delta_2=\min(P_{PUSCH, j, MCG}-\delta_1, P_{Remaining})$. That is, a power value that is requested for the PUSCH transmission which includes the UCI is allocated from the residual guaranteed power in the MCG to the MCG. At this time, in a case where the residual guaranteed power in the MCG falls short of the power that is requested for the PUSCH transmission which includes the UCI, the entire residual guaranteed power is allocated to the MCG and then as much power as a power shortage is allocated from the residual power to the MCG. At this point, additionally, in the case where the residual power insufficiently falls short, the entire residual power is allocated to the MCG. The value of as much power as is allocated from the residual guaranteed power or the residual power is added to the power value of the MCG. The value of as much power as is allocated to the MCG is subtracted from the residual guaranteed power or the residual power. Moreover, $P_{PUSCH, j, MCG}$ is a power value that is requested for the PUSCH transmission which includes the UCI in the MCG, and is configured based on the parameter that is configured by the higher layer, an adjustment value that is determined by the number of PRBs which are allocated, by the resource assignment, for the PUSCH transmission, a downlink path loss and a coefficient by which the downlink path loss is multiplied, an adjustment value that is determined by a parameter which indicates an offset of the MCS, which is applied to the UCI, the value that is based on the TPC command, or the like.

As a step (s5), the following arithmetic operation is performed. If there is the PUSCH transmission that includes the UCI in the SCG (or if the terminal device 1 recognizes that there is the PUSCH transmission which includes the UCI in the SCG), the arithmetic operations, that is, $P_{SCG}=P_{SCG}+\delta_1+\delta_2$, $P_{SeNB, Remaining}=P_{SeNB, Remaining}-\delta_1$, and $P_{Remaining}=P_{Remaining}-\delta_2$, are performed. At this point, $\delta_1=\min(P_{PUSCH, j, SCG}, P_{SeNB, Remaining})$, and $\delta_2=\min(P_{PUSCH, j, SCG}-\delta_1, P_{Remaining})$. That is, the power value that is requested for the PUSCH transmission which includes the UCI is allocated from the residual guaranteed power in the SCG to the SCG. At this time, in a case where the residual guaranteed power in the SCG falls short of the power that is requested for the PUSCH transmission which includes the UCI, the entire residual guaranteed power is allocated to the SCG and then as much power as a power shortage is allocated from the residual power to the SCG. At this point, additionally, in the case where the residual power insufficiently falls short, the entire residual power is allocated to the SCG. The value of as much power as is allocated from the residual guaranteed power or the residual power is added to the power value of the SCG. The value of as much power as is allocated to the SCG is subtracted from the residual guaranteed power or the residual power. Moreover, $P_{PUSCH, j, SCG}$ is a power value that is requested for the PUSCH transmission which includes the UCI in the SCG, and is configured based on the parameter that is configured by the higher layer, the adjustment value that is determined by the number of PRBs which are allocated, by the resource assignment, for the PUSCH transmission, the downlink path loss and the coefficient by which the downlink path loss is multiplied, the adjustment value that is determined by the parameter which indicates the offset of the MCS, which is applied to the UCI, the value that is based on the TPC command, or the like.

As a step (s6), the following arithmetic operation is performed. If there are one or more PUSCH transmissions (the PUSCH transmissions that do not include the UCI) in the MCG (or if the terminal device 1 recognizes that there is the PUSCH transmission in the MCG), the arithmetic operations, that is, $P_{MCG}=P_{MCG}+\delta_1+\delta_2$, $P_{MeNB, Remaining}=P_{MeNB, Remaining}-\delta_1$, and $P_{Remaining}=P_{Remaining}-\delta_2$, are performed. At this point, $\delta_1=\min(\Sigma_{PPUSCH, c, MCG}, P_{MeNB, Remaining})$, and $\delta_2=\min(\Sigma_{PPUSCH, c, MCG}-\delta_1, P_{Remaining})$. That is, a value of a sum of the power values that are requested for the PUSCH transmission is allocated from the residual guaranteed power in the MCG to the MCG. At this time, in a case where the residual guaranteed power in the MCG falls short of the value of a sum of the powers that are requested for the PUSCH transmission, the entire residual guaranteed power is allocated to the MCG and then as much power as a power shortage is allocated from the residual power to the MCG. At this point, additionally, in the case where the residual power insufficiently falls short, the entire residual power is allocated to the MCG. The value of as much power as is allocated from the residual guaranteed power or the residual power is added to the power value of the MCG. The value of as much power as is allocated to the MCG is subtracted from the residual guaranteed power or the residual power. Moreover, $P_{PUSCH, c, MCG}$ is a power value that is requested for the PUSCH transmission in the serving cell c that belongs to the MCG, and is calculated based on the parameter that is configured by the higher layer, the adjustment value that is determined by the number of PRBs which are allocated, by the resource assignment, for the PUSCH transmission, the downlink path loss and the coefficient by which the downlink path loss is multiplied, the value that is based on the TPC command, or the like. Furthermore, $\Sigma$ means the sum, and $\Sigma_{PPUSCH, c, MCG}$ indicates a sum value of $P_{PUSCH, c, MCG}$ in the serving cell c, in which c≠j.

As a step (s7), the following arithmetic operation is performed. If there are one or more PUSCH transmissions (the PUSCH transmissions that do not include the UCI) in the SCG (or if the terminal device 1 recognizes that there is the PUSCH transmission in the SCG), the arithmetic operations, that is, $P_{SCG}=P_{SCG}+\delta_1+\delta_2$, $P_{SeNB, Remaining}=P_{SeNB, Remaining}-\delta_1$, and $P_{Remaining}=P_{Remaining}-\delta_2$, are performed. At this point, $\delta_1=\min(\Sigma_{PPUSCH, c, SCG}, P_{SeNB, Remaining})$, and $\delta_2=\min(\Sigma_{PPUSCH, c, SCG}-\delta_1, P_{Remaining})$. That is, the value of the sum of the power values that are requested for the PUSCH transmission is allocated from the residual guaranteed power in the SCG to the SCG. At this time, in a case where the residual guaranteed power in the SCG falls short of the value of the sum of the powers that are requested for the PUSCH transmission, the entire residual guaranteed power is allocated to the SCG and then as much power as a power shortage is allocated from the residual power to the SCG. At this point, additionally, in the case where the residual power insufficiently falls short, the entire residual power is allocated to the SCG. The value of as much power as is allocated from the residual guaranteed power or the residual power is added to the power value of the SCG. The value of as much power as is allocated to the SCG is subtracted from the residual guaranteed power or the residual power. Moreover, $P_{PUSCH, c, SCG}$ is a power value that is requested for the PUSCH transmission in the serving cell c that belongs to the SCG, and is calculated based on the parameter that is configured by the higher layer, the adjustment value that is determined by the number of PRBs which are allocated, by the resource assignment, for the PUSCH transmission, the downlink path loss and the coefficient by which the downlink path loss is multiplied, the value that is based on the TPC command, or the like. Furthermore, $\Sigma$ means the sum, and $\Sigma_{PPUSCH, c, SCG}$ indicates a sum value of $P_{PUSCH, c, SCG}$ in the serving cell c, in which c≠j.

As a step (s8), the following arithmetic operation is performed. If a subframe that is a power calculation target is a subframe in the MCG, $P_{CMAX, CG}$ that is a maximum output power value for the CG that is a target is set to $P_{CMAX, CG}=P_{MCG}$. In other cases, more precisely, if the subframe that is the power calculation target is a subframe in the SCG, $P_{CMAX, CG}$ that is the maximum output power value for the CG that is a target is set to $P_{CMAX, CG}=P_{SCG}$.

In this manner, the maximum output power value in the CG that is a target can be calculated from the guaranteed power and the residual power. Moreover, as initial values of the power value of the MCG, the power value of the SCG, the residual power, and the residual guaranteed power in each of the steps described above, their respective final values in the immediately preceding step are used.

Moreover, at this point, as priority ranking for allocation, this sequence: the PUCCH in the MCG, the PUCCH in the SCG, the PUSCH that includes the UCI in the MCG, the PUSCH that does not include the UCI in the MCG, the PUSCH that does not include the UCI in the SCG is used, but no limitation this is imposed. Other priority ranking can be used. For example, this sequence: a channel in the MCG, which includes the HARQ-ACK, a channel in the SCG, which includes the HARQ-ACK, the PUSCH (which does not the HARQ-ACK) in the MCG, the PUSCH (which does not include the HARQ-ACK) in the SCG may be used. Furthermore, this sequence: a channel that includes the SR, the channel (which does not include the SR) that includes the HARQ-ACK, a channel (which does not include the SR or the HARQ-ACK) that includes the CSI, a channel (which does not include the UCI) that includes data may be used without a distinction between the MCG and the SCG. In these cases, request power values may be replaced in step s2 to step s7, which are described above. In a case where multiple channels are targets in one step, a value of a sum of request powers for these channels may be used as in step s6 or step s7. Alternatively, a method such as one in which some of the steps described above are not performed can be used. Furthermore, in addition to the channels described above, the priority ranking may be performed considering the PRACH, the SRS, or the like. At this time, the PRACH may have a higher priority level than the PUCCH, and the SRS may have a lower priority level than the PUSCH (which does not include the UCI).

Another method of allocating the guaranteed power and the remaining power will be described below.

First, as a step (t1), the power value of the MCG, the power value in the SCG, the residual power (the unallocated residual power), a total request power in the MCG, and a total request power in the SCG are initialized. More specifically, it is assumed that $P_{MCG}=0$, $P_{SCG}=0$, and $P_{Remaining}=P_{CMAX}$. Furthermore, it is assumed that $P_{MCG, Required}=0$, and $P_{SCG, Required}=0$. At this point, $P_{MCG}$ and $P_{SCG}$ are the power value of the MCG and the power value of the SCG, respectively, and $P_{Remaining}$ is the residual power value. $P_{CMAX}$, $P_{MeNB}$ and $P_{SeNB}$ are the parameters described above. Furthermore, $P_{MCG, Required}$ and $P_{SCG, Required}$ are a total request power value that is requested for transmitting a channel within the MCG and a total request power value that is requested for transmitting a channel within the SCG, respectively. Moreover, at this point, each power value is linear.

Next, the residual power is sequentially allocated to each CG, in this sequence: the PUCCH in the MCG, the PUCCH in the SCG, the PUSCH that includes the UCI in the MCG, the PUSCH that does not include the UCI in the MCG, the PUSCH that does not include the UCI in the SCG. At this time, the amount of power that is sequentially allocated to each CG is basically the power value (the power value that is based on the Transmit Power Control (TPC) command, the resource assignment, or the like) that is requested for each channel. However, in a case where the residual power does not satisfy the power value that is requested, the entire residual power is allocated. When the power is allocated to the CG, as much residual power as the allocated power is decreased. Furthermore, the power value that is requested for the channel is added to the total request power in this CG. Moreover, the power value that is requested is added without depending whether or not the residual power falls short of the power value that is requested. As more specific steps of calculating the power value of every CG, (t2) to (t9) will be described below.

As a step (t2), the following arithmetic operation is performed. If there is the PUCCH transmission in the MCG, the arithmetic operations, that is, $P_{MCG}=P_{MCG}+\delta$, $P_{MCG, Required}=P_{MCG, Required}-P_{PUCCH, MCG}$, and $P_{Remaining}=P_{Remaining}-\delta$, are performed. At this point, $\delta=\min(P_{PUCCH, MCG}, P_{Remaining})$. That is, the power value that is requested for the PUCCH transmission is allocated from the residual power to the MCG. At this time, in a case where the residual power falls short of the power that is requested for the PUCCH transmission, the entire residual power is allocated to the MCG. The power value that is requested for the PUCCH transmission is added to a total request power value of the MCG. The value of as much power as is allocated to the MCG is subtracted from the residual power.

As a step (t3), the following arithmetic operation is performed. If there is the PUCCH transmission in the SCG, the arithmetic operations, that is, $P_{ScG}=P_{SCG}+\delta$, $P_{SCG, Required}=P_{SCG, Required}-PP_{UCCH, SCG}$, and $P_{Remaining}=P_{Remaining}-\delta$ are performed. At this point, $\delta=\min(P_{PUCCH, SCG}, P_{Remaining})$ That is, the power value that is requested for the PUCCH transmission is allocated from the residual power to the SCG. At this time, in the case where the residual power falls short of the power that is requested for the PUCCH transmission, the entire residual power is allocated to the SCG. The power value that is requested for the PUCCH transmission is added to a total request power value of the SCG. The value of as much power as is allocated to the SCG is subtracted from the residual power.

As a step (t4), the following arithmetic operation is performed. If there is the PUSCH transmission that includes the UCI in the MCG, the arithmetic operations, that is, $P_{MCG}=P_{MCG}+\delta$, $P_{MCG, Required}=P_{MCG, Required}-P_{PUSCH, j, MCG}$, and $P_{Remaining}=P_{Remaining}-\delta$, are performed. At this point, $\delta=\min(P_{PUSCH, j, MCG}, P_{Remaining})$ That is, the power value that is requested for the PUSCH transmission which includes the UCI is allocated from the residual power to the MCG. At this time, in a case where the residual power falls short of the power that is requested for the PUSCH transmission which includes the UCI, the entire residual power is allocated to the MCG. The power value that is requested for the PUSCH transmission that includes the UCI is added to the total request power value of the MCG. The value of as much power as is allocated to the MCG is subtracted from the residual power.

As a step (t5), the following arithmetic operation is performed. If there is the PUSCH transmission that includes the UCI in the SCG, the arithmetic operations, that is, $P_{SCG}=P_{SCG}+\delta$, $P_{SCG, Required}=P_{SCG, Required}-P_{PUSCH, j, SCG}$, and $P_{Remaining}=P_{Remaining}-\delta$, are performed. At this point, $\delta=\min(P_{PUSCH, j, SCG}, P_{Remaining})$. That is, the power value that is requested for the PUSCH transmission which includes the UCI is allocated from the residual power to the SCG. At this time, in the case where the residual power falls short of the power that is requested for the PUSCH transmission which includes the UCI, the entire residual power is allocated to the SCG. The power value that is requested for the PUSCH transmission that includes the UCI is added to the total request power value of the SCG. The value of as much power as is allocated to the SCG is subtracted from the residual power.

As a step (t6), the following arithmetic operation is performed. If there are one or more PUSCH transmissions (one or more PUSCH transmissions that do not include the UCI) in the MCG, the arithmetic operations, that is, $P_{MCG}=P_{MCG}+\delta$, $P_{MCG, Required}=P_{MCG, Required}-\Sigma P_{PUSCH, c, MCG}$, and $P_{Remaining}=P_{Remaining}-\delta$, are performed. At this point, $\delta=\min(\Sigma P_{PUSCH, c, MCG}, P_{Remaining})$. That is, the value of the sum of the power values that are requested for the PUSCH transmission is allocated from the residual power to the MCG. At this time, in a case where the residual power falls short of the value of the sum of the powers that are requested for the PUSCH transmission, the entire residual power is allocated to the MCG. The value of as much power as is allocated from the residual power is added to the power value of the MCG. The value of the sum of the power values that are requested for the PUSCH transmission is added to the total request power value of the MCG. The value of as much power as is allocated to the MCG is subtracted from the residual power.

As a step (t7), the following arithmetic operation is performed. If there are one or more PUSCH transmissions (one or more PUSCH transmissions that do not include the UCI) in the SCG, the arithmetic operations, that is, $P_{SCG}=P_{SCG}+\delta$, $P_{SCG, Required}=P_{SCG, Required}-\Sigma_{PPUSCH, c, SCG}$, and $P_{Remaining}=P_{Remaining}-\delta$, are performed. At this point, $\delta=\min(\Sigma P_{PUSCH, c, SCG}, P_{Remaining})$. That is, the value of the sum of the power values that are requested for the PUSCH transmission is allocated from the residual power to the SCG. At this time, in the case where the residual power falls short of the value of the sum of the powers that are requested for the PUSCH transmission, the entire residual power is allocated to the SCG. The value of as much power as is allocated from the residual power is added to the power value of the SCG. The value of the sum of the power values that are requested for the PUSCH transmission is added to the total request power value of the SCG. The value of as much power as is allocated to the SCG is subtracted from the residual power.

As a step (t8), it is checked whether or not a power value that is allocated to each CG is equal to or greater than (falls below) the guaranteed power. Furthermore, it is checked whether or not the power value that is allocated to each CG is consistent with (does not fall below) the total request power value (that is, whether or not a channel, the residual power value for which does not satisfy the request power value, is present within the channel within the CG). In a case where the power value is neither equal to nor greater than the guaranteed power (falls below the guaranteed power) in a certain CG (the CG1) and in a case where the power value is not consistent with the total request power value (falls below the total request power value), as much power as a power shortage is allocated from the power value that is allocated to a different CG (a CG2) to the CG (the CG1) that lacks the power. As much power as the power shortage is subtracted from the final power value of the different CG (CG2), and as a result, the final power value is a value that results from subtracting the guaranteed power in the CG 1 from $P_{CMAX}$. Accordingly, in a case where the request power is satisfied in a certain CG, because the guaranteed power may not be satisfied, the power can be efficiently used. As a more specific example, the arithmetic operations as in a step (t8-1) and a step (t8-2) are performed. As the step (t8-1), if $P_{MCG}<P_{MeNB}$ and $P_{MCG}<P_{MCG, Required}$, setting to $P_{MCG}=P_{MeNB}$ is accomplished, and setting to $P_{SCG}=P_{CMAX}-P_{MCG}$ (more precisely, $P_{SCG}=P_{CMAX}-P_{MeNB}$) is accomplished. As the step (t8-2), if $P_{SCG}<P_{SeNB}$ and $P_{SCG}<P_{SCG, Required}$ (alternatively, without a condition in the step (t8-1) being satisfied, if $P_{SCG}<P_{SeNB}$ and $P_{ScG}<P_{SCG, Required}$), setting to $P_{SCG}=P_{SeNB}$ is accomplished, and setting to $P_{MCG}=P_{CMAX}-P_{SCG}$ (more precisely, $P_{MCG}=P_{CMAX}-P_{SeNB}$) is accomplished.

As a step (t9), the following arithmetic operation is performed. If the subframe that is the power calculation target is the subframe in the MCG, $P_{CMAX, CG}$ that is the maximum output power value for the CG that is a target is set to $P_{CMAX, CG}=P_{MCG}$. In other cases, more precisely, if the subframe that is the power calculation target is the subframe in the SCG, $P_{CMAX, CG}$ that is the maximum output power value for the CG that is a target is set to $P_{CMAX, CG}=P_{SCG}$.

In this manner, the maximum output power value (that is, $P_{MCG}$ or $P_{SCG}$ that is finally obtained) in the CG that is a target can be calculated from the guaranteed power and the residual power. Moreover, as initial values of the power value of the MCG, the power value of the SCG, the residual power, the total request power in the MCG, and the total request power in the SCG in each of the steps described above, their respective final values in the immediately preceding step are used.

Furthermore, instead of the step (t8), the following step (a step (t10)) may be performed. That is, it is checked whether or not the power value that is allocated to each CG is equal to or greater than (does not fall below) the guaranteed power. In the case where the power value is neither equal to nor greater than the guaranteed power (falls below the guaranteed power) in a certain CG (the CG1), as much power as a power shortage is allocated from the power value that is allocated to a different CG (the CG2) to the CG (the CG1) that lacks the power. As much power as the power shortage is subtracted from the final power value of the different CG (CG2), and as a result, the final power value is the smaller of the value that results from subtracting the guaranteed power in the CG 1 from $P_{CMAX}$ and the total request power value of the CG 2. Accordingly, in each CG, because the guaranteed power can be necessarily secured, stable communication can be performed. As a more specific example, the arithmetic operations as in a step (t10-1) and a step (t10-2) are performed. As the step (t10-1), if $P_{MCG}<P_{MeNB}$, setting to $P_{MCG}=P_{MeNB}$ is accomplished, and setting to $P_{SCG}=\min(P_{SCG, Required}, P_{CMAX}-P_{MeNB})$ is accomplished. As the step (t10-2), if $P_{SCG}<P_{SeNB}$, setting to $P_{SCG}=P_{SeNB}$ is accomplished, and setting to $P_{MCG}=\min(P_{MCG, Required}, P_{CMAX}-P_{SeNB})$ is accomplished.

Moreover, at this point, as the priority ranking for allocation, this sequence: the PUCCH in the MCG, the PUCCH in the SCG, the PUSCH that includes the UCI in the MCG, the PUSCH that does not include the UCI in the MCG, the PUSCH that does not include the UCI in the SCG is used, but no limitation this is imposed. Other priority ranking (for example, the priority ranking described above and the like) can be used.

The method of allocating the guaranteed power and the remaining power for determining the maximum output power value of every CG has been described so far. Power distribution within the CG at less than the maximum output power value of every CG will be described below.

First, power distribution in a case where the dual connectivity is not configured is described. As will be described below, a power for each physical uplink channel is determined based on whether or not $P_{CMAX}$ is exceeded.

In a case where it is thought that a total transmit power in the terminal device 1 exceeds $P_{CMAX}$, the terminal device 1 schedules $P_{PUSCH, c}$ in the serving cell c in a case where the condition that $\Sigma(wP_{PUSCH, c}) \leq (P_{CMAX}-P_{PUCCH})$, is satisfied. At this point, w is a scheduling factor (a coefficient by which the power value is multiplied) for the serving cell c, and is a value that is equal to or greater than 0 and equal to or smaller than 1. In a case where there is no PUCCH transmission, it is assumed that $P_{PUCCH}=0$.

In a case where the terminal 1 performs the PUSCH transmission that includes the UCI in a certain serving cell j and performs the PUSCH transmission that does not include the UCI in any one of the remaining serving cells, and in a case where it is thought that the total transmit power in the terminal device 1 exceeds $P_{CMAX}$, the terminal device 1 schedules $P_{PUSCH, c}$ in the serving cell c that does not include the UCI, in such a manner that the condition that $\Sigma(wP_{PUSCH, c}) \leq (P_{CMAX}-P_{PUSCH, j})$ is satisfied. However, the left side is a total in the serving cell c other than the serving cell j. At this point, w is the scheduling factor for the serving cell c that does not include the UCI. At this point, as long as a case where $\Sigma(wP_{PUSCH, c})=0$ and the total transmit power in the terminal device 1 exceeds $P_{CMAX}$ as before does not take place, power scaling is not applied to the PUSCH that includes the UCI. However, w is a value that is common to each of the serving cells when w>0, but w may be 0 for a certain serving cell. At this time, this means that channel transmission in this serving cell is dropped.

In a case where the terminal 1 performs the concurrent transmission of the PUCCH and the PUSCH that includes the UCI in a certain serving cell j and performs the PUSCH transmission that does not include the UCI in any one of the remaining serving cells and in a case where it is thought that the total transmit power in the terminal device 1 exceeds $P_{CMAX}$, the terminal device 1 obtains $P_{PUSCH, c}$ based on $P_{PUSCH, j}=\min(P_{PUSCH, j}, (P_{CMAX}-P_{PUCCH}))$ and $\Sigma(wP_{PUSCH, c}) \leq (P_{CMAX}-P_{PUCCH}-P_{PUSCH, j})$. That is, a power for the PUCCH is first reserved, and then a power for the PUSCH that includes the UCI is calculated from the remaining power. At this time, in a case where the remaining power is greater than a request power ($P_{PUSCH, j}$ on the right side of the first equation) for the PUSCH that includes the UCI, the request power for the PUSCH that includes the UCI is assumed to be a power ($P_{PUSCH, j}$ on the left side of the first equation, that is, an actual power value of the PUSCH that includes the UCI) for the PUSCH that includes the UCI, and in a case where the remaining power is smaller than or equal to the request power for the PUSCH that includes the UCI, the entire remaining power is assumed to be the power for the PUSCH that includes the UCI. The remaining power that results from deducting the power for the PUCCH and the power for the PUSCH that includes the UCI is allocated to the PUSCH that does not include the UCI. At this time, the scheduling is performed if need arises.

If multiple Timing Advance Groups (TAGs) are configured for the terminal device 1 and the PUCCH/PUSCH transmission by the terminal device 1 in the subframe i for a certain serving cell in one TAG overlaps some of the initial symbols for the PUSCH transmission in the subframe i+1 for a different serving cell in a different TAG, the terminal device 1 adjusts the total transmit power in the terminal device 1 in such a manner that $P_{CMAX}$ is not exceeded in any overlapping portion. At this point, the TAG is a group of serving cells for adjustment of an uplink transmission timing with respect to a downlink reception timing. One or more serving cells belong to one TAG, and a common adjustment is applied to the one or more serving cells in the one TAG.

If multiple TAGs are configured for the terminal device 1 and the PUSCH transmission by the terminal device 1 in the subframe i for a certain serving cell in one TAG overlaps some of the initial symbols for the PUCCH transmission in the subframe i+1 for a different serving cell in a different TAG, the terminal device 1 adjusts the total transmit power in the terminal device 1 in such a manner that $P_{CMAX}$ is not exceeded in any overlapping portion.

If multiple TAGs are configured for the terminal device 1 and SRS transmission by the terminal device 1 in one symbol in the subframe i for a certain serving cell in one TAG overlaps the PUCCH/PUSCH transmission in the subframe i or the subframe i+1 for a different serving cell in a different TAG, terminal device 1 drops the SRS transmission if the total transmit power in the terminal device 1 exceeds $P_{CMAX}$ in any overlapping portion of the symbol.

If multiple TAGs and more than two serving cells are configured for the terminal device 1 and the SRS transmission by the terminal device 1 in one symbol in the subframe i for a certain serving cell overlaps the SRS transmission in the subframe i for a different serving cell and the PUCCH/PUSCH transmission in the subframe i or the subframe i+1 for a different serving cell, the terminal device 1 drops the SRS transmission if the total transmit power in the terminal device 1 exceeds $P_{CMAX}$ in any overlapping portion of the symbol.

If multiple TAGs are configured for terminal device 1, when performance of the PRACH transmission in the secondary serving cell concurrently with the SRS transmission in a symbol in a subframe in a different serving cell that belongs to a different TAG is requested by the higher layer, the terminal device 1 drops the SRS transmission if the total transmit power in the terminal device 1 exceeds $P_{CMAX}$ in any overlapping portion of the symbol.

If multiple TAGs are configured for terminal device 1, when the performance of the PRACH transmission in the secondary serving cell concurrently with the PUSCH/PUCCH transmission in a subframe in a different serving cell that belongs to a different TAG is requested by the higher layer, the terminal device 1 adjusts the transmit power for the PUSCH/PUCCH in such a manner that the total transmit power in the terminal device 1 does not exceed $P_{CMAX}$ in any overlapping portion.

Next, power distribution within the CG in a case where the dual connectivity is configured is described. As will be described below, in each of the CGs, the power for each physical uplink channel within the CG is determined based on whether or not $P_{CMAX}$, CG is exceeded.

In a case where it is thought that the total transmit power in the terminal device 1 in a certain CG exceeds $P_{CMAX}$, CG, the terminal device 1 schedules $P_{PUSCH, c}$ in the serving cell c in the CG, in such a manner that the condition that $P_{PUCCH}$=min $P_{PUCCH}$ $P_{CMAX, CG}$) and $\Sigma(wP_{PUSCH, c}) \leq (P_{CMAX, CG} - P_{PUCCH})$ is satisfied. That is, in a case where the maximum output power value of the CG is greater than a request power ($P_{PUCCH}$ on the right side of the first equation) for the PUCCH, the request power for the PUCCH is set as the power ($P_{PUCCH}$ on the left side of the first equation, that is, an actual power value of the PUCCH) for the PUCCH, and in a case where the maximum output power value of the CG is smaller than or equal to the request power for the PUCCH, all maximum output power values of the CG are set as the power for the PUCCH. A power that results from deducting the power for the PUCCH from $P_{CMAX, CG}$ is allocated to the PUSCH. At this time, the scheduling is performed if need arises. In a case where there is no PUCCH transmission in the CG, it is assumed that $P_{PUCCH}$=0. Moreover, $P_{PUCCH}$ on the right side of the second equation is $P_{PUCCH}$ that is calculated in the first equation.

In a case where the terminal 1 performs the PUSCH transmission that includes the UCI in a certain serving cell j in a certain CG and performs the PUSCH transmission that does not include the UCI in any one of the remaining serving cells in the CG, and in a case where it is thought that the total transmit power in the terminal device 1 in the CG exceeds $P_{CMAX, CG}$ the terminal device 1 schedules $P_{PUSCH, c}$ in the serving cell c that does not include the UCI, in such a manner that the condition that $P_{PUSCH, j}$=min $(P_{PUSCH, j}, (P_{CMAX, CG} - P_{PUCCH}))$ and $\Sigma(wP_{PUSCH, c}) \leq (P_{CMAX, CG} - P_{PUSCH, j})$ is satisfied. However, the left side of the second equation is a total in the serving cell c other than the serving cell j. Moreover, $P_{PUSCH, j}$ on the right side of the second equation is $P_{PUSCH, j}$ that is calculated in the first equation.

In a case where in a certain CG, the terminal 1 performs the concurrent transmission of the PUCCH and the PUSCH that includes the UCI in a certain serving cell j and performs the PUSCH transmission that does not include the UCI in any one of the remaining serving cells and in a case where it is thought that the total transmit power in the terminal device 1 in the CG exceeds $P_{CMAX, CG}$, the terminal device 1 obtains $P_{PUSCH, c}$ based on $P_{PUCCH}$=min $(P_{PUCCH}, P_{CMAX, CG})$ $P_{PUSCH, j}$ =min $(P_{PUSCH, j}, (P_{CMAX, CG} - P_{PUCCH}))$, and $\Sigma(wP_{PUSCH, c}) \leq (P_{CMAX, CG} - P_{PUCCH} - P_{PUSCH, j})$ That is, the power for the PUCCH is first reserved from the maximum output power in the CG, and then the power for the PUSCH that includes the UCI is calculated from the remaining power. At this time, in a case where the maximum output power the CG is greater than the request power for the PUCCH, the request power for the PUCCH is set as the transmit power for the PUCCH, and in a case where the maximum output power value of the CG is smaller than or equal to the request power for the PUCCH, the maximum output power in the CG is set as the transmit power for the PUCCH. In the same time, in the case where the remaining power is greater than the request power for the PUSCH that includes the UCI, the request power for the PUSCH that includes the UCI is assumed to be the transmit power for the PUSCH that includes the UCI, and in the case where the remaining power is smaller than or equal to the request power for the PUSCH that includes the UCI, the entire remaining power is assumed to be the transmit power for the PUSCH that includes the UCI. The remaining power that results from deducting the power for the PUCCH and the power for the PUSCH that includes the UCI is allocated to the PUSCH that does not include the UCI. At this time, the scheduling is performed if need arises.

With regard to the power adjustment or the dropping of the SRS in a case where multiple TAGs are configured, the same processing as in a case where the dual connectivity is not configured may be performed. In this case, it is preferable that the same processing is performed on multiple TAGs within the CG and the same processing is performed on multiple TAGs in a different CG as well. Alternatively, processing that will be described below may be performed. Furthermore, both of these may be performed.

If multiple TAGs within one CG are configured for the terminal device 1 and the PUCCH/PUSCH transmission by the terminal device 1 in the subframe i for a certain serving cell in one TAG within the CG overlaps some of the initial symbols for the PUSCH transmission in the subframe i+1 for a different serving cell in a different TAG within the CG, the terminal device 1 adjusts the total transmission power in the terminal device 1 in such a manner that $P_{CMAX, CG}$ of the CG is not exceeded in any overlapping portion.

If multiple TAGs within one CG are configured for the terminal device 1 and the PUSCH transmission by the terminal device 1 in the subframe i for a certain serving cell in one TAG within the CG overlaps some of the initial symbols for the PUCCH transmission in the subframe i+1 for a different serving cell in a different TAG within the CG, the terminal device 1 adjusts the total transmission power in the terminal device 1 in such a manner that $P_{CMAX, CG}$ of the CG is not exceeded in any overlapping portion.

If multiple TAGs within one CG are configured for the terminal device 1 and the SRS transmission by the terminal device 1 in one symbol in the subframe i for a certain serving cell in one TAG within the CG overlaps the PUCCH/

PUSCH transmission in the subframe i or the subframe i+1 for a different serving cell in a different TAG within the CG, the terminal device 1 drops the SRS transmission if the total transmission power in the terminal device 1 exceeds $P_{CMAX,\ CG}$ of the CG in any overlapping portion of the symbol.

If multiple TAGs and more than two serving cells within one CG are configured for the terminal device 1 and the SRS transmission by the terminal device 1 in one symbol in the subframe i for a certain serving cell within the CG overlaps the SRS transmission in the subframe i for a different serving cell within the CG and the PUCCH/PUSCH transmission in the subframe i or the subframe i+1 for a different serving cell within the CG, the terminal device 1 drops the SRS transmission if the total transmit power in the terminal device 1 exceeds $P_{CMAX,\ CG}$ of the CG in any overlapping portion of the symbol.

If multiple TAGs within one CG are configured for terminal device 1, when performance of the PRACH transmission in the secondary serving cell within the CG concurrently with the SRS transmission in a symbol in a subframe in a different serving cell that belongs to a different TAG within the CG is requested by the higher layer, the terminal device 1 drops the SRS transmission if the total transmission power in the terminal device 1 exceeds $P_{CMAX,\ CG}$ of the CG in any overlapping portion of the symbol.

If multiple TAGs within one CG are configured for terminal device 1, when the performance of the PRACH transmission in the secondary serving cell within the CG concurrently with the PUSCH/PUCCH transmission in a subframe in a different serving cell that belongs to a different TAG within the CG is requested by the higher layer, the terminal device 1 adjusts the transmit power for the PUSCH/PUCCH in such a manner that the total transmit power in the terminal device 1 does not exceed $P_{CMAX,\ CG}$ of the CG in any overlapping portion.

In this manner, even in a case where the dual connectivity is configured, control of the transmit power can be efficiently performed among the cell groups.

Moreover, according to the embodiments described above, the power value that is requested for each PUSCH transmission is described as being calculated based on the parameter that is configured by the higher layer, the adjustment value that is determined by the number of PRBs which are allocated, by the resource assignment, for the PUSCH transmission, the downlink path loss and the coefficient by which the downlink path loss is multiplied, the adjustment value that is determined by the parameter which indicates the offset of the MCS, which is applied to the UCI, the value that is based on the TPC command, or the like. Furthermore, the power value that is requested for each PUCCH transmission is described as being calculated based on the parameter that is configured by the higher layer, the downlink path loss, the adjustment value that is determined by the UCI which is transmitted over the PUCCH, the adjustment value that is determined by the PUCCH format, the adjustment value that is determined by the number of antenna ports which are used for the PUCCH transmission, the value that is based on the TPC command, or the like. However, no limitation to this is imposed. An upper limitation value can be provided to the power value that is requested, the smaller of values, that is, a value that is based on the parameter described above and an upper limitation value (for example, $P_{CMAX,\ c}$ that is the maximum output power value in the serving cell c) can be used as the power value that is requested.

Moreover, according to the embodiments described above, the case where the serving cells are grouped in the connectivity groups is described, but no limitation to this is imposed. For example, in multiple serving cells, only downlink signals can be grouped, and only uplink signals can be grouped. In this case, the connectivity identifier is configured for the downlink signal or the uplink signal. Furthermore, the downlink signals and the uplink signals can be grouped in a dedicated manner. In this case, the connectivity identifiers are configured for the downlink signal or the uplink signal, respectively, in a dedicated manner. Alternatively, the downlink component carriers can be grouped, and the uplink component carriers can be grouped. In this case, the connectivity identifiers are configured for the component carriers, respectively, in a dedicated manner.

Furthermore, according to each embodiment described above, the descriptions are provided using the connectivity group, but there is no need to necessarily stipulate a set of serving cells that are provided by the same base station apparatus (transmission points), with the connectivity group. Instead of the connectivity group, the set of serving cells can be stipulated using the connectivity identifier or the cell index. For example, in a case where the set of serving cells is stipulated with the connectivity identifier, in other words, the connectivity group according to each embodiment described above can be said to be a set of serving cells that have a value of the same connectivity identifier. Alternatively, in a case where the set of serving cells is stipulated with the cell index, in other words, the connectivity group according to each embodiment described above can be said to be a set of serving cells, whose cell index values are prescribed values (fall within a prescribed range).

Furthermore, according to each embodiment described above, the descriptions are provided using the term "primary cell" or "PS cell" but these terms do not necessarily need to be used. For example, the primary cell according to each embodiment described above can be referred to as a master cell, and the PS cell according to each embodiment described above can be referred to as a primary cell.

A program running on the base station apparatus 2-1 or the base station apparatus 2-2, and the terminal device 1 according to the present invention may be a program (a program for causing a computer to operate) that controls a Central Processing Unit (CPU) and the like in such a manner as to realize the functions according to the embodiments of the present invention, which is described above. Then, pieces of information that are handled in the apparatus and the device are temporarily accumulated in a Random Access Memory (RAM) while being processed. Thereafter, the pieces of information are stored in various types of ROMs such as a Flash Read Only Memory (ROM), or a Hard Disk Drive (HDD) and, if need arises, are read by the CPU to be modified or rewritten.

Moreover, a portion of each of the terminal device 1 and the base station apparatus 2-1 or the base station apparatus 2-2 according to the embodiments, which are described above, may be realized by the computer. In such a case, the portion may be realized by recording a program for realizing such a control function on a computer-readable medium and causing a computer system to read the program recorded on the recording medium for execution.

Moreover, the "computer system" here is assumed to be a computer system that is built into the terminal device 1, or the base station apparatus 2-1 or the base station apparatus 2-2 and to include an OS or hardware components such as a peripheral device. Furthermore, the "computer-readable recording medium" refers to a portable medium, such as a flexible disk, a magneto-optical disk, a ROM, and a CD-ROM, and a storage device, such as a hard disk, that is built into the computer system.

Moreover, the "computer-readable recording media" may include a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time. Furthermore, the program described above may be one for realizing some of the functions described above and additionally may be one that can realize the functions described above in combination with a program that is already recorded on the computer system.

Furthermore, the base station apparatus 2-1 or the base station apparatus 2-2 according to the embodiments, which is described above, can be realized as an aggregation (an apparatus group) that is constituted from multiple apparatuses. Each of the apparatuses that constitute the apparatus group may be equipped with some portions or all portions of each function of, or some portions or all portions of each functional block of the base station apparatus 2-1 or the base station apparatus 2-2 according to the embodiments, which is described above. The apparatus group itself may have each general function of or each general functional block of the base station apparatus 2-1 or the base station apparatus 2-2. Furthermore, the terminal device 1 according to the embodiments, which is described above, is also capable of communicating with the base station apparatus as an aggregation.

Furthermore, the base station apparatus 2-1 or the base station apparatus 2-2 according to the embodiments, which is described above, may be Evolved Universal Terrestrial Radio Access Network (EUTRAN). Furthermore, the base station apparatus 2-1 or the base station apparatus 2-2 according to the embodiments, which is described above, may have some portions or all portions of a function of a node that is at a higher level than an eNodeB.

Furthermore, some portions or all portions of each of the terminal device 1, and the base station apparatus 2-1 or the base station apparatus 2-2 according to the embodiments, which are described above, may be realized as an LSI that is a typical integrated circuit and may be realized as a chip set. Each functional block of the terminal device 1, and the base station apparatus 2-1 or the base station apparatus 2-2 may be individually realized into a chip, and some or all of the functional blocks may be integrated into a chip. Furthermore, a circuit integration technique is not limited to the LSI, and an integrated circuit for the functional block may be realized as a dedicated circuit or a general-purpose processor. Furthermore, if with advances in semiconductor technology, a circuit integration technology for a circuit with which an LSI is replaced will appear, it is also possible that an integrated circuit to which such a technology is applied is used.

Furthermore, according to the embodiments, as described above, a cellular mobile station apparatus is described as one example of a terminal device or a communication device, but the present invention is not limited to this, and can be applied also to a terminal apparatus or a communication apparatus, such as a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiments of the invention are described in detail above referring to the drawings, but the specific configuration is not limited to the embodiments and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments also fall within the technical scope of the present invention. Furthermore, a configuration in which a constituent element that achieves the same effect is substituted for the one that is described above according to each embodiment described above also falls within the technical scope of the present invention.

INDUSTRIAL APPLICABILITY

An aspect of the present invention is that the present invention can be applied to a terminal device, a base station apparatus, and a communication method, in all of which communication needs to be efficiently performed without depending on a backhaul speed.

REFERENCE SIGNS LIST

501 HIGHER LAYER
502 CONTROL UNIT
503 CODEWORD GENERATION UNIT
504 DOWNLINK SUBFRAME GENERATION UNIT
505 DOWNLINK REFERENCE SIGNAL GENERATION UNIT
506 OFDM SIGNAL TRANSMISSION UNIT
507 TRANSMIT ANTENNA
508 RECEIVE ANTENNA
509 SC-FDMA SIGNAL RECEPTION UNIT
510 UPLINK SUBFRAME PROCESSING UNIT
511 UPLINK CONTROL INFORMATION EXTRACTION UNIT
601 RECEIVE ANTENNA
602 OFDM SIGNAL RECEPTION UNIT
603 DOWNLINK SUBFRAME PROCESSING UNIT
604 DOWNLINK REFERENCE SIGNAL EXTRACTION UNIT
605 TRANSPORT BLOCK EXTRACTION UNIT
606, 1006 CONTROL UNIT
607, 1007 HIGHER LAYER
608 CHANNEL STATE MEASUREMENT UNIT
609, 1009 UPLINK SUBFRAME GENERATION UNIT
610 UPLINK CONTROL INFORMATION GENERATION UNIT
611, 612, 1011 SC-FDMA SIGNAL TRANSMISSION UNIT
613, 614, 1013 TRANSMIT ANTENNA

The invention claimed is:
1. A terminal device comprising:
a higher layer processing unit that configures a first cell group and a second cell group and configures $P_{MeNB}$ that is a guaranteed power in the first cell group, and $P_{SeNB}$ that is a guaranteed power in the second cell group; and
an uplink subframe generation unit that generates a physical uplink channel, and wherein a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that is performed by the terminal device with use of at least $P_{CMAX}$ that is a maximum transmit power for the terminal device and $P_{SeNB}$, and $P_{SCG}$ is calculated by an arithmetic operation that is performed by the terminal device with use of at least the $P_{CMAX}$ and $P_{MeNB}$, in a case where dual connectivity is configured for the physical uplink channel, wherein a value of the $P_{CMAX}$ is set to the $P_{MCG}$, in a case where the terminal device recognizes that a subframe in the second cell group does not overlap a subframe in the first cell group, wherein a power for the physical uplink channel in a subframe i1 in the first cell group, which overlaps a subframe i2-1 and a subframe i2 in the second cell group, is determined based on at least the terminal device total configured maximum output power and the power in the second cell group, and wherein the power in the second cell group is the largest of a first value that is based on the second guaranteed power, a second value that is based on a power for a physical uplink channel in the subframe i2-1 in the second cell group, and a third value that is based on a power for a physical uplink channel in the subframe i2 in the second cell group.

2. The terminal device according to claim 1, wherein a value that is $P_{CMAX}$ is configured for $P_{SCG}$, in a case where the terminal device recognizes that a subframe in the first cell group does not overlap a subframe in the second cell group.

3. A base station apparatus that communicates with a terminal device, the base station apparatus comprising:

a higher layer processing unit that configures a first cell group and a second cell group and configures $P_{MeNB}$ that is a guaranteed power in the first cell group, and $P_{SeNB}$ that is a guaranteed power in the second cell group; and an uplink subframe reception unit that receives a physical uplink channel, and wherein a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that is performed by the terminal device with use of at least $P_{CMAX}$ that is a maximum transmit power for the terminal device and $P_{SeNB}$, and $P_{SCG}$ is calculated by an arithmetic operation that is performed by the terminal device with use of at least the $P_{CMAX}$ and $P_{MeNB}$, in a case where dual connectivity is configured for the physical uplink channel, wherein a value of the $P_{CMAX}$ is set to the $P_{MCG}$, in a case where the terminal device recognizes that a subframe in the second cell group does not overlap a subframe in the first cell group, wherein a power for the physical uplink channel in a subframe i1 in the first cell group, which overlaps a subframe i2-1 and a subframe i2 in the second cell group, is determined based on at least the terminal device total configured maximum output power and the power in the second cell group, and wherein the power in the second cell group is the largest of a first value that is based on the second guaranteed power, a second value that is based on a power for a physical uplink channel in the subframe i2-1 in the second cell group, and a third value that is based on a power for a physical uplink channel in the subframe i2 in the second cell group.

4. The base station apparatus according to claim 3, wherein a value that is $P_{CMAX}$ is configured for $P_{SCG}$, in a case where the terminal device recognizes that a subframe in the first cell group does not overlap a subframe in the second cell group.

5. A communication method for use in a terminal device, the communication method comprising:

a step of configuring a first cell group and a second cell group;

a step of configuring $P_{MeNB}$ that is a guaranteed power in the first cell group, and $P_{SeNB}$ that is a guaranteed power in the second cell group; and a step of generating a physical uplink channel, and wherein a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that is performed by the terminal device with use of at least $P_{CMAX}$ that is a maximum transmit power for the terminal device and $P_{SeNB}$, and $P_{SCG}$ is calculated by an arithmetic operation that is performed by the terminal device with use of at least the $P_{CMAX}$ and $P_{MeNB}$, in a case where dual connectivity is configured for the physical uplink channel, wherein a value of the $P_{CMAX}$ is set to the $P_{MCG}$, in a case where the terminal device recognizes that a subframe in the second cell group does not overlap a subframe in the first cell group, wherein a power for the physical uplink channel in a subframe i1 in the first cell group, which overlaps a subframe i2-1 and a subframe i2 in the second cell group, is determined based on at least the terminal device total configured maximum output power and the power in the second cell group, and wherein the power in the second cell group is the largest of a first value that is based on the second guaranteed power, a second value that is based on a power for a physical uplink channel in the subframe i2-1 in the second cell group, and a third value that is based on a power for a physical uplink channel in the subframe i2 in the second cell group.

6. A communication method for use in a base station apparatus that communicates with a terminal device, the communication method comprising:

a step of configuring a first cell group and a second cell group;

a step of configuring $P_{MeNB}$ that is a guaranteed power in the first cell group, and $P_{SeNB}$ that is a guaranteed power in the second cell group; and a step of receiving a physical uplink channel, and wherein a power for the physical uplink channel in the first cell group is determined based on whether or not $P_{MCG}$ that is a maximum transmit power for the first cell group is exceeded, a power for the physical uplink channel in the second cell group is determined based on whether or not $P_{SCG}$ that is a maximum transmit power for the second cell group is exceeded, $P_{MCG}$ is calculated by an arithmetic operation that is performed by the terminal device with use of at least $P_{CMAX}$ that is a maximum transmit power for the terminal device and $P_{SeNB}$, and $P_{SCG}$ is calculated by an arithmetic operation that is performed by the terminal device with use of at least the $P_{CMAX}$ and $P_{MenB}$, in a case where dual connectivity is configured for the physical uplink channel, wherein a value of the $P_{CMAX}$ is set to the $P_{MCG}$, in a case where the terminal device recognizes that a subframe in the second cell group does not overlap a subframe in the first cell group, wherein a power for the physical uplink channel in a subframe i1 in the first cell group, which overlaps a subframe i2−1 and a subframe i2 in the second cell group, is determined based on at least the terminal device total configured maximum output power and the power in the second cell group, and wherein the power in the second cell group is the largest of a first value that is based on the second guaranteed power, a second value that is based on a power for a physical uplink channel in the subframe i2−1 in the second cell group, and a third value that is based on a power for a physical uplink channel in the subframe i2 in the second cell group.

* * * * *